(12) United States Patent
Kikuta et al.

(10) Patent No.: US 9,327,689 B2
(45) Date of Patent: May 3, 2016

(54) WASHING DEVICE FOR VEHICLE

(71) Applicant: ASMO CO., LTD., Shizuoka-ken (JP)

(72) Inventors: Tomoyuki Kikuta, Toyohashi (JP);
Yukihiro Matsushita, Hamamatsu (JP);
Hidetoshi Suzuki, Hamamatsu (JP);
Noriyuki Fukaya, Kariya (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 506 days.

(21) Appl. No.: 13/850,174

(22) Filed: Mar. 25, 2013

(65) Prior Publication Data

US 2013/0255023 A1    Oct. 3, 2013

(30) Foreign Application Priority Data

| Mar. 28, 2012 | (JP) | 2012-074349 |
| Mar. 30, 2012 | (JP) | 2012-080032 |
| Apr. 27, 2012 | (JP) | 2012-102669 |
| Sep. 11, 2012 | (JP) | 2012-199738 |

(51) Int. Cl.
*B60S 1/48*    (2006.01)
*B60S 1/56*    (2006.01)
*B60S 1/58*    (2006.01)

(52) U.S. Cl.
CPC ............ *B60S 1/483* (2013.01); *B60S 1/486* (2013.01); *B60S 1/56* (2013.01); *B60S 1/583* (2013.01); *B60S 1/48* (2013.01); *B60S 1/58* (2013.01)

(58) Field of Classification Search
CPC ............ B60S 1/48; B60S 1/52; B60S 1/58; B60S 1/481; B60S 1/483; B60S 1/583; B60S 1/486

USPC ............. 15/250.02; 239/284.1; 318/DIG. 2
See application file for complete search history.

(56) References Cited

U.S. PATENT DOCUMENTS

| 5,018,366 | A | 5/1991 | Tanaka et al. | |
| 2003/0029932 | A1 | 2/2003 | Nakano et al. | |
| 2003/0090569 | A1 | 5/2003 | Poechmueller | |
| 2003/0222156 | A1 | 12/2003 | Bissonnette | |
| 2006/0011223 | A1* | 1/2006 | Peterson | B60S 3/04 134/123 |
| 2009/0250533 | A1* | 10/2009 | Akiyama | B60S 1/58 239/284.1 |
| 2011/0073142 | A1* | 3/2011 | Hattori | B60S 1/0848 134/56 R |
| 2011/0266375 | A1 | 11/2011 | Ono et al. | |

(Continued)

FOREIGN PATENT DOCUMENTS

| JP | S53-133340 U | 10/1978 |
| JP | 61-85781 U | 6/1986 |

(Continued)

OTHER PUBLICATIONS

Japanese Office Action of JP 2012-074349 dated Aug. 11, 2015 with its English Translation.

(Continued)

*Primary Examiner* — Michael Jennings
(74) *Attorney, Agent, or Firm* — Christensen Fonder P.A.

(57) ABSTRACT

When receiving no reverse state signal, which indicates that a vehicle is in reverse, a wash control circuit allows the actuation of the wiper motor by the interlocking operation and retains a changeover valve device on the side of the window washing nozzle. When receiving a reverse state signal, the wash control circuit switches the changeover valve device from the window washing nozzle to a camera washing nozzle and inhibits the actuation of the wiper motor by the interlocking operation.

18 Claims, 9 Drawing Sheets

(56) References Cited

U.S. PATENT DOCUMENTS

| | | | |
|---|---|---|---|
| 2011/0292212 A1* | 12/2011 | Tanabe | B05B 1/08 348/148 |
| 2012/0117745 A1 | 5/2012 | Hattori et al. | |
| 2012/0266926 A1* | 10/2012 | Kikuta | B60S 1/481 134/58 R |
| 2013/0037627 A1* | 2/2013 | Kikuta | B60S 1/485 239/284.1 |
| 2013/0048035 A1* | 2/2013 | Doi | B60S 1/48 134/113 |

FOREIGN PATENT DOCUMENTS

| | | |
|---|---|---|
| JP | 1-203667 | 8/1989 |
| JP | H05-049532 U | 6/1993 |
| JP | 07-117634 | 5/1995 |
| JP | 11-255018 A | 9/1999 |
| JP | 2003-054385 | 2/2003 |
| JP | 2003-525165 | 8/2003 |
| JP | 2004-182080 A | 7/2004 |
| JP | 2005-158870 A | 6/2005 |
| JP | 2009-248661 A | 10/2009 |
| JP | 2011-230672 A | 11/2011 |
| JP | 2011-240910 A | 12/2011 |
| JP | 2011-245989 A | 12/2011 |
| JP | 2012-236583 A | 12/2012 |

OTHER PUBLICATIONS

Japanese Office Action of JP 2012-080032 dated Aug. 11, 2015 with its English Translation.

Japanese Office Action of JP 2012-102669 dated Sep. 29, 2015 with its English Translation.

* cited by examiner

WASHING DEVICE FOR VEHICLE

BACKGROUND

The present disclosure relates to a washing device for a vehicle.

With the proliferation of vehicle navigation systems in recent years, it is presently known that a vehicle user can attentively observe what is behind the vehicle while in reverse by use of an onboard camera installed at the rear of the vehicle that captures a rear view representing what exists or what is going on behind the vehicle and presents the captured view on a display of the vehicle navigation system. Because the onboard camera is located on the outside of the vehicle, however, a situation can arise where mud, or the like, adheres to the lens of the onboard camera. Accordingly, the onboard camera cannot pick up the rear view of the vehicle sufficiently well, making it difficult for the user to thoroughly observe what is behind the vehicle.

Under such circumstances, Japanese Laid-Open Patent Publication No. 11-255018 proposes a washing device for a vehicle provided with a nozzle that ejects washer fluid onto a lens of an onboard camera for removing foreign matter adhering thereto and a pump that supplies the washer fluid to the nozzle. This kind of vehicular washing device enables a driver to wash the onboard camera while staying in the vehicle interior.

Also, a washing device for a vehicle described in Japanese Laid-Open Patent Publication No. 2004-182080, for example, is provided with a single electric pump for selectively supplying washer fluid to a window washing nozzle or to a camera washing nozzle. In this vehicular washing device, a changeover valve is connected to the electric pump, and the window washing nozzle and the camera washing nozzle are connected to the changeover valve, so that the vehicular washing device can selectively supply the washer fluid to one of the nozzles chosen by the working of the changeover valve caused by manipulating a switch provided at the driver's seat. Accordingly, the vehicular washing device can selectively eject the washer fluid onto a window of the vehicle or onto a capturing surface of an onboard camera. This kind of vehicular washing device can wash the vehicle window and the onboard camera by use of the electric pump and a fluid tank, which are common to both.

Incidentally, Japanese Laid-Open Utility Model Publication No. 61-85781 discloses as an example of the changeover valve a solenoid changeover valve device that switches between different fluid channels only while a voltage is applied. Specifically, the solenoid changeover valve device, which is provided with an excitation coil, drives the valve by an electromagnetic force generated when the excitation coil is energized so as to switch the fluid channel only while the excitation coil is energized.

The vehicular washing device of Japanese Laid-Open Patent Publication No. 2004-182080 selectively supplies washer fluid to a first nozzle (window washing nozzle) or a second nozzle (camera washing nozzle), that is, toward a first object to be washed or a second object to be washed by means of the single electric pump. In this vehicular washing device, the changeover valve is connected to the electric pump. The first nozzle and the second nozzle are connected to the changeover valve, so that the washer fluid can be selectively fed into one of the first nozzle and the second nozzle with aid of the changeover valve. Accordingly, this vehicular washing device can selectively eject the washer fluid onto one of the first object to be washed and the second object to be washed.

Japanese Laid-Open Patent Publication No. 2011-245989 also proposes a washing device for a vehicle provided with a camera washing nozzle for removing foreign matter adhering to a lens of an onboard camera by spraying a washer fluid thereto. In the vehicular washing device described in Japanese Laid-Open Patent Publication No. 2011-245989, an electric pump for feeding the washer fluid stored in a tank located at a front part of the vehicle is connected to a rear window washing nozzle located at a rear part of the vehicle via a main pipe and a branch pipe that branches from the main pipe is connected to a camera washing nozzle. Then, a changeover device capable of selecting one of fluid channels may be provided at a branching part where the branch pipe branches out from the main pipe as disclosed in Japanese Laid-Open Utility Model Publication No. 61-85781, for example.

The vehicular washing device of Japanese Laid-Open Patent Publication No. 11-255018 includes a washer fluid tank and a pump dedicated to washing the lens of the onboard camera, however. This results in a need for spaces for installing the tank and the pump and a cost increase.

Also, if the vehicular washing device employing the solenoid changeover valve device as described in Japanese Laid-Open Utility Model Publication No. 61-85781 is left in a state where the fluid channel is switched for a particularly long time, a high voltage continues to be applied to the changeover valve even after the fluid channel has been switched. This increases the power consumption.

Also, in the vehicular washing device of Japanese Laid-Open Patent Publication No. 2004-182080, the washer fluid may unexpectedly leak from the first nozzle (window washing nozzle) or the second nozzle (camera washing nozzle) regardless of the driver's intent during acceleration, deceleration or turning of the vehicle, or when the volume of the washer fluid increases due to expansion caused by exposure to sunlight or heat generated by an engine of the vehicle, for example.

Generally, the onboard camera installed at the rear of the vehicle begins to shoot an image of the rear view when a shift lever is shifted to the reverse position, so that it is desirable to switch the changeover device to the camera washing nozzle when the backup lamp is turned on. Typically, however, the backup lamp is provided in the body of the vehicle, while the camera washing nozzle is typically arranged in a back door. Thus, depending on varying locations of the backup lamp and the camera washing nozzle, tasks for wiring of signal lines and arranging the main pipe and branch pipes may potentially be laborious, or wiring and piping may be needed to be done over substantial lengths.

SUMMARY

It is an objective of the present disclosure to provide a washing device for a vehicle that can prevent a wiper from being caused to unintentionally scrape across a vehicle window in a dried state while causing the wiper to operate in an interlocked action with ejection of washer fluid onto the vehicle window without providing dedicated components such as a fluid tank or an electric pump.

It is another objective of the present disclosure to provide a washing device for a vehicle that can wash a vehicle window and an onboard camera by means of an electric pump and a fluid tank that are commonly used, allowing for a reduction in power consumption.

It is still another objective of the present disclosure to provide a washing device for a vehicle that can selectively eject washer fluid onto a first object to be washed or a second object to be washed by means of a single electric pump and can prevent unintentional leaks of the washer fluid from a window washing nozzle or a camera washing nozzle.

It is a further objective of the present disclosure to provide a washing device for a vehicle configured to facilitate work for laying wires and pipes and shorten the lengths of these materials.

In accordance with one aspect of the present disclosure, a washing device for a vehicle is provided that includes a camera washing nozzle for spraying washer fluid onto an image capturing surface of an onboard camera arranged outside the vehicle, a window washing nozzle for spraying washer fluid onto a vehicle window, and an electric pump for feeding the washer fluid stored in a tank, a branch pipe branched from a main pipe, which connects the electric pump and the window washing nozzle. The branch pipe connects the main pipe and the camera washing nozzle. The washing device also includes a change over valve device, a wiper motor for actuating a wiper that wipes the window of the vehicle, a wiper washer switch capable of performing interlocking operation for actuating the electric pump and the wiper motor together, and a wash control circuit. The changeover valve device is provided in a branched portion of the main pipe and the branch pipe. The changeover valve is capable of selectively switching the flow path of the washer fluid from the electric pump to the window washing nozzle or to the camera washing nozzle. When receiving no reverse state signal, which indicates that the vehicle is in reverse, the wash control circuit holds the changeover valve device on the side of the window washing nozzle and allows actuation of the wiper motor by the interlocking operation. Based on input of a reverse state signal, the wash control circuit interlocking operation switches the changeover valve device from the window washing nozzle to the camera washing nozzle and inhibits the actuation of the wiper motor by the interlocking operation.

According to the above configuration, the washing device for a vehicle comprises a changeover valve device capable of alternatively switching the flow of the washer fluid from the electric pump to the window washing nozzle or to the camera washing nozzle. Therefore, the onboard camera can be washed by utilizing existing electric pumps or tanks for washing the windows. As a result, for example, the installation space can be made small while keeping the cost low.

The actuation of the wiper motor by the interlocking operation is allowed while keeping the changeover valve device on the side of the window washing nozzle when the reverse state signal, which indicates that the vehicle is in reverse, is not input. Thus, the interlocking operation of the wiper washer switch can actuate the electric pump and the wiper motor together, and the vehicle window can be wiped by spraying the washer fluid onto the vehicle window and operating the wiper together.

Based on the input of the reverse state signal, the changeover valve device is switched from the window washing nozzle to the camera washing nozzle, and the actuation of the wiper motor by the interlocking operation is inhibited. Thus, for example, if the interlocking operation of the wiper washer switch is performed when the reverse state signal is being input, the electric pump is actuated in a state where the changeover valve device is switched to the camera washing nozzle, but the wiper motor is not actuated, thereby enabling washing of the image capturing surface of the onboard camera by spraying washer fluid on the image capturing surface of the onboard camera. Since the wiper motor is not actuated, wiping of a dry vehicle window by the wiper is prevented, for example.

In accordance with one aspect, the washing device further includes a valve controlling section. The valve controlling section applies a switching voltage to the changeover valve device for a predetermined first time period based on input of the reverse state signal. After the first time period and during a period in the valve controlling section continues to receive the reverse state signal, the valve controlling section applies a switched state retaining voltage, which is lower than the switching voltage, instead of the switching voltage.

According to the above configuration, a voltage is applied to the changeover valve device for while a reverse state signal, which indicates that the vehicle is in reverse, is output. Thus, the channel of the washer fluid from the electric pump is switched from the window washing nozzle to the camera washing nozzle. Therefore, the vehicle window and the onboard camera can be washed while sharing the electric pump and the tank, for example. As a result, the installation space can be made small and the costs are reduced.

Based on the input of the reverse state signal, a switching voltage is applied to the changeover valve device for a predetermined first time period, and during a period when the reverse state signal continues to be input after the first time period has elapsed, a switched state retaining voltage being lower than the switching voltage is applied instead of the switching voltage. Thus, unnecessary power consumption is prevented. Namely, although the changeover valve device requires high voltage switching voltage, the state of the channel is maintained with a low switched state retaining voltage after the switching. Therefore, in the above configuration, less power consumption is achieved compared to when high voltage switching voltage is applied even after the switching.

In accordance with one aspect, the valve controlling section is a voltage reduction controlling section, which applies the switched state retaining voltage to the changeover valve device by reducing the switching voltage.

According to the above configuration, the valve controlling section is a voltage reduction controlling section, which applies the switched state retaining voltage to the changeover valve device by reducing the switching voltage. Therefore, the power supply wiring from the power supply to the changeover valve device is achieved with one circuit. Therefore, for example, compared to those in which power supply lines are connected in parallel to apply each voltage independently for switching voltage and switched state retaining voltage to the changeover valve device, the length of the wirings used can be made shorter.

In accordance with one aspect, the voltage reduction controlling section includes a voltage-dividing resistor connected to a ground-side terminal of the changeover valve device, a first switching element connected in between the voltage-dividing resistor and the ground, the first switching element being turned on while the reverse state signal is input, a second switching element connected in between the ground-side terminal of the changeover valve device and the ground, and a timer. When receiving the reverse state signal, the timer outputs a timer signal to turn on the second switching element for the first time period.

According to the above configuration, the ground-side terminal of the changeover valve device is connected to the ground via the voltage-dividing resistor by the first switching element being turned on while the reverse state signal is input. When the reverse state signal is input, the timer outputs a timer signal to turn on the second switching element for the first time period. Thus, the ground-side terminal of the changeover valve device is connected directly (via the second switching element) to the ground. Therefore, since the current flows without going through the voltage-dividing resistor until the first time period elapses, the high switching voltage is applied to the changeover valve device. While the reverse state signal is still input after the first time period had lapsed, the second switching element is turned off, the current flows via voltage-dividing resistor, and the low voltage switched state retaining voltage is applied to the changeover valve device. In this way, the ground-side terminal of the directional valve control device is already connected to the ground via the voltage-dividing resistor before the second switching element is turned off. Therefore, a state where the voltage is momentarily not applied to the directional valve control device when it is switched from the switching voltage to the switched state retaining voltage, and a good switching condition is maintained. Namely, in a circuit configuration where the ground-side terminal of the changeover valve device is connected to the ground via voltage-dividing resistor as the second switching element is turned off, there is a possibility in which the voltage is momentarily not applied to the changeover valve device when the switching voltage is switched to switched state retaining voltage, and the switched state may not be maintained. However, this embodiment can prevent this from happening.

In accordance with one aspect, the washing device for a vehicle further includes a pump controlling section, which causes the changeover valve device to perform flow channel switching operation with the electric pump is stopped.

According to the above configuration, the pump controlling section causes the changeover valve device to perform switching operation in a state where the electric pump is deactivated. Therefore, a quick switching operation can be performed in a state where the pressure inside the pipe is sufficiently low (low load). Therefore, the power for actuating the changeover valve device is kept low, and a good switching response is obtained, for example. Since the electric pump does not actuate while the switching operation is performed by the changeover valve device, unintended spraying of washer fluid on the vehicle window is prevented, for example.

In accordance with one aspect, the washing device for a vehicle further includes a check valve provided in a channel between the camera washing nozzle and the changeover valve device and a check valve provided in a channel between the window washing nozzle and the changeover valve device. The check valves allow the washer fluid to pass through when the pressure of the washer fluid fed from the changeover valve device is more than or equal to a predetermined pressure. The changeover valve device allows influx of washer fluid from the camera washing nozzle when receiving no reverse state signal.

According to the above configuration, washer fluid can be fed to the window washing nozzle via the first outlet portion of the changeover valve device when the electric pump is actuated while the changeover valve device is not actuated. When the electric pump is actuated while the changeover valve device is actuated, the washer fluid can be fed to the camera washing fluid via the second outlet portion of the changeover device. Thus, washer fluid can be sprayed towards the first and second objects to be washed by a single tank and a single electric pump.

Since a check valve is provided in each of a channel between the camera washing nozzle and the changeover valve device, and between the window washing nozzle and the changeover valve device, the washer fluid under the predetermined pressure is prevented from flowing to the windows washing nozzle and the camera washing nozzle. Therefore, an unintentional leakage of the washer fluid from the window washing nozzle or the camera washing nozzle upon acceleration, deceleration or turning of a vehicle is prevented.

Furthermore, the changeover valve device allows influx of washer fluid from the camera washing nozzle even when it is deactivated, namely, when the inlet portion is connected to the first outlet of the changeover valve device. Therefore, even if the volume of the residual washer fluid in the second branch pipe between the changeover valve device and the check valve increases due to heating by sunlight or by heat of the vehicle engine, it can be put back to the tank via the changeover valve device. Namely, compared to a configuration where the changeover valve device completely blocks the influx of washer fluid from the camera washing nozzle when the changeover valve device is deactivated, the residual washer fluid in the second branch pipe between the changeover valve device and the check valve may leak from the camera washing nozzle when it expands due to heat and reaches the predetermined pressure. However, the configuration of the present application prevents this from happening.

In accordance with one aspect, the main pipe is formed by a common pipe connecting the electric pump and the changeover valve device to each other and a main branch pipe connecting the changeover valve device and the window washing nozzle to each other. The changeover valve device has an inlet portion connected to the common pipe, a first outlet portion connected to the main branch pipe, and a second outlet portion connected to the branch pipe. When receiving no reverse state signal, the changeover valve device presses a valve body with urging force of an urging member to bring the valve body into contact with an inner opening of the second outlet portion, thereby closing the inner opening, and connects an inner opening of the first outlet portion to the inlet portion. When receiving the reverse state signal, the changeover valve device actuates and presses the valve body against the urging force of the urging member to bring the valve body into contact with the inner opening of the first outlet thereby closing the inner opening and connects the inner opening of the second outlet portion to the inlet portion. The urging force of the urging member is set such that the urging member allows the influx of washer fluid from the camera washing nozzle at a pressure lower than the predetermined pressure.

According to the above configuration, when receiving no reverse state signal, the changeover valve device presses the valve with an urging force of an urging member to bring the valve body into contact with an inner opening of the second outlet portion to close the inner opening, and connects an inner opening of the first outlet portion to the inlet portion. Meanwhile, the influx of washer fluid from the camera washing nozzle (the second outlet portion) is allowed with less pressure than the predetermined pressure of the check valve. With such configuration, the effects described in one aspect of the disclosure can be achieved with a simple configuration by installation of the urging member.

In accordance with one aspect, the tank and the electric pump are arranged in a front part of the vehicle. The camera washing nozzle and the window washing nozzle are arranged in a rear part of the vehicle. The changeover valve device is arranged in the rear part of the vehicle.

According to the above configuration, in the embodiment where the tank and the electric pump are arranged in the front part of the vehicle, while the first and the camera washing nozzle are arranged in the rear of the vehicle, the changeover valve device is arranged in the rear of the vehicle. Therefore, compared to the case where the changeover valve device is arranged in the front part of the vehicle, the total length of the common pipe, the first and the second branch pipes can be made shorter. Therefore, the material cost and the installation cost of the pipes are reduced.

In accordance with one aspect, the window washing nozzle, the camera washing nozzle, the changeover valve device, the wash control circuit, and a backup lamp, which is provided in the rear part of the vehicle and is lit when the shift lever is in the reverse position, are all provided in a back door.

According to the above configuration, the window washing nozzle, the camera washing nozzle, the changeover valve device, the wash control device, and the backup lamp are all provided in the back door. Therefore, compared to a case where any one of those is provided in the vehicle body, the present configuration reduces the distance in which the pipes and the wires are branched. Thus, the installation of wiring and the piping (main pipe or branch pipes) is made easier, and the length of those materials is reduced.

In accordance with one aspect, the wash control circuit also controls operation of a wiper motor, and the wiper motor is provided in the back door.

According to the above configuration, the rear wiper motor controlled by the control device is also provided in the back door. Therefore, the wiring connecting the control device and the rear wiper motor is made short.

In accordance with one aspect, the washing device for a vehicle further includes a touch panel controlling section, which displays, on a display provided in the vehicle, an image captured by the onboard camera and a touch panel switch for washing the camera, during the reverse state, and actuates the electric pump based on the operation of the touch panel switch for washing of the camera.

According to the above configuration, when the vehicle is in reverse, the image captured by the onboard camera as well as a touch panel switch for washing the camera is displayed on a display provided in the vehicle. For example, when a driver recognizes by looking at the screen that the image capturing surface is dirty, the image capturing surface of the onboard camera can be washed by operating (touching) the touch panel switch. Therefore, in such a case, for example, there is no need for a complex lever operation where the switches for washing such as the wiper washer switch capable of performing interlocking operation are grouped. Therefore, mistakes and confusions upon operation are prevented, and the image capturing surface of the onboard camera can be washed precisely and swiftly.

In accordance with one aspect, the reverse state signal, which indicates that the vehicle is in reverse, is an electrical signal of the reverse position out of the positions of the shift lever, which is part of the transmission of the vehicle.

According to the above configuration, when the driver operates the shift lever to the reverse position in order to reverse the vehicle on his own will, the flow channel of the washer fluid from the electric pump is switched to the camera washing nozzle, and if the driver further operates the wiper washer switch or the like on his on will, the image capturing surface of the onboard camera is washed instantly.

In accordance with one aspect, the reverse state signal is a power supply to a backup lamp provided in a rear part of the vehicle. The backup lamp is lit when the shift lever is in the reverse position. The wash control circuit is arranged in the rear part of the vehicle. Part of the power supply to the backup lamp is input as the reverse state signal.

According to the above configuration, by utilizing the fact that the back lamp provided in the rear part of the car is lit when the shift lever is in the reverse position, and using part of the power supply thereof as a reverse state signal, the signal wiring from the shift lever and the wash control circuit in the rear of the vehicle are made considerably shorter compared to a case where these are provided in parallel.

Other aspects and advantages of the disclosure will become apparent from the following description, taken in conjunction with the accompanying drawings, illustrating by way of example the principles of the disclosure.

BRIEF DESCRIPTION OF THE DRAWINGS

FIG. 7(*b*) is a schematic configuration diagram of the vehicular washing device of the third embodiment;

DESCRIPTION OF THE PREFERRED EMBODIMENTS (First Embodiment)

Figure 1:
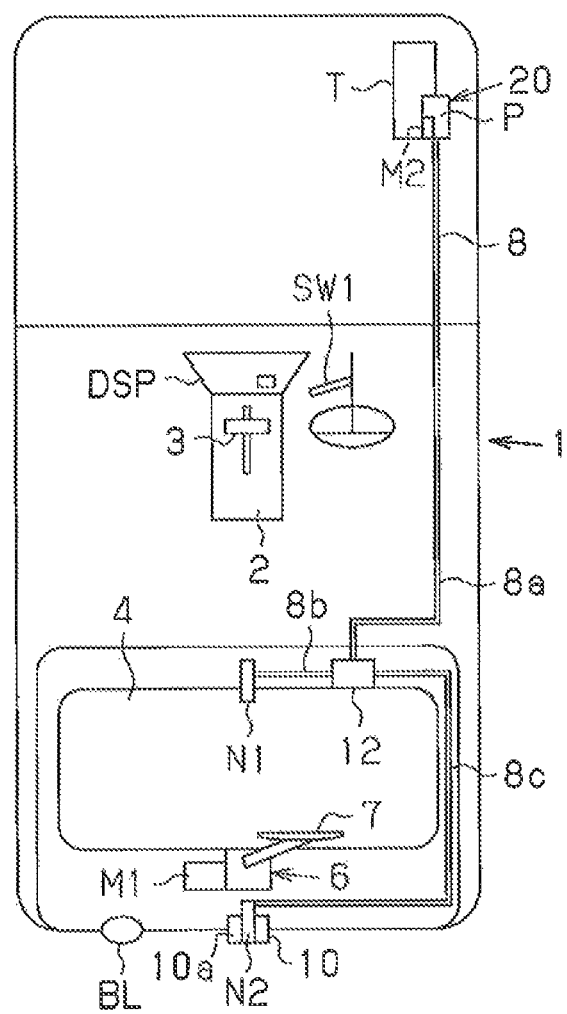
FIG. 1 is a schematic configuration diagram of a vehicle provided with a vehicular washing device according to a first embodiment.
Figure 2:
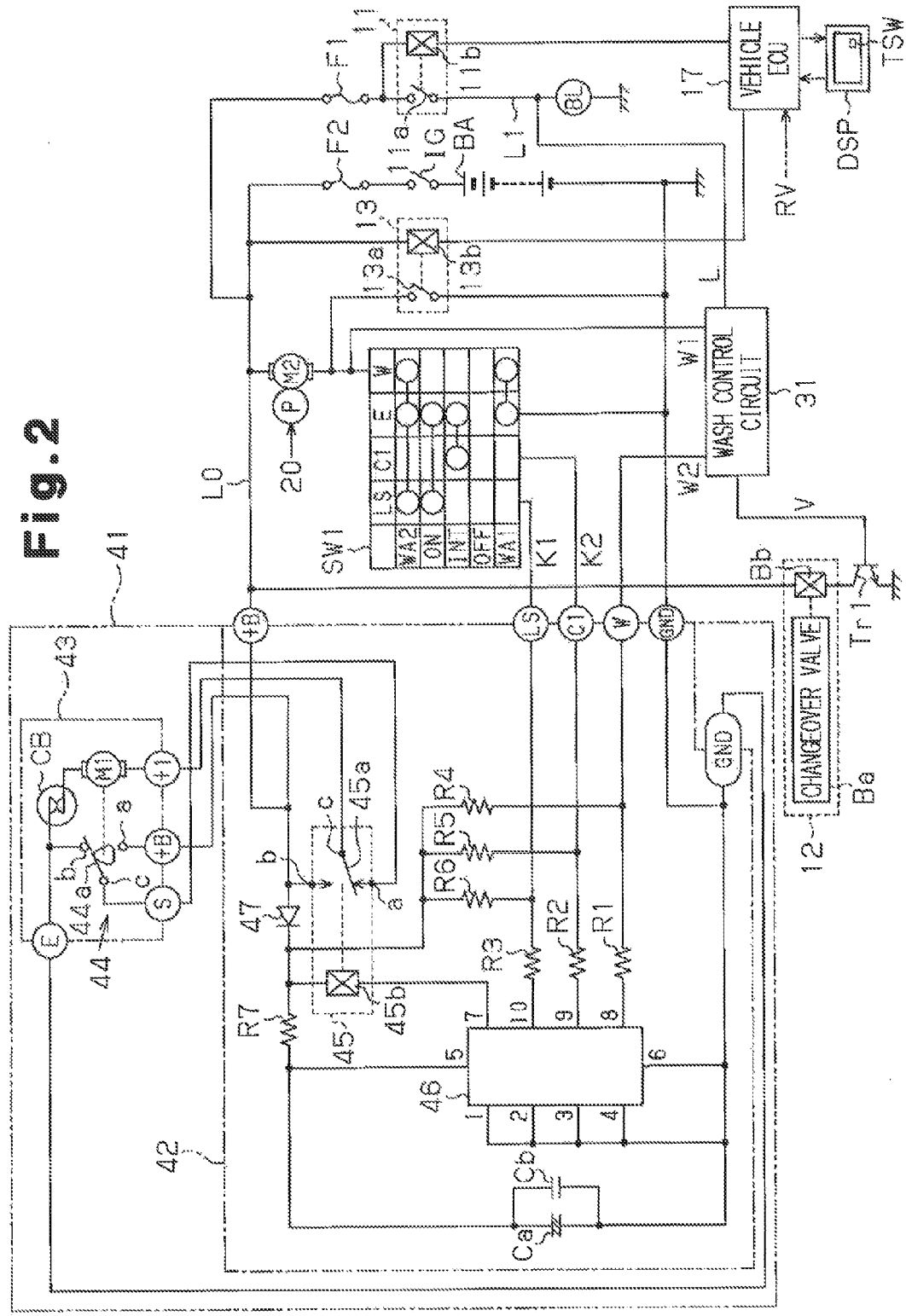
FIG. 2 is an electric circuit diagram used for explaining the electrical configuration of the vehicular washing device of the first embodiment.

A vehicular washing device according to a first embodiment of this disclosure is described hereunder with reference to FIGS. 1 and 2.

As depicted in FIG. 1, a vehicle 1 is provided with a shift lever 3 of a transmission 2. The shift lever 3 is located beside the driver's seat. The vehicle 1 is shifted from one gear to another by manipulating the shift lever 3. When the shift lever 3 is moved to the first gear position, the transmission 2 alters the gear ratio of the vehicle 1 to a value corresponding to the first gear. When the transmission 2 is moved to the second gear position, the shift lever 3 alters the gear ratio of the vehicle 1 to a value corresponding to the second gear. Also, when the transmission 2 is moved to the neutral position, the shift lever 3 alters the gear ratio of the vehicle 1 to a value corresponding to the neutral position.

Further, when the shift lever 3 is shifted to the backup, or the reverse position, the transmission 2 puts the vehicle 1 in reverse, in which the driver can reverse the vehicle 1. While the shift lever 3 is held at the reverse position, a backup lamp BL provided at the rear part of the vehicle 1 is kept lit.

A display DSP of a navigation system used for on-screen presentation of the vehicle's current position, a map and other information is installed in the console panel of a center console of the vehicle 1.

There is provided a rear wiper unit 6 at a rear central position of the vehicle 1 below a rear window 4, which is one of vehicle windows. The rear wiper unit 6 is provided with a wiper motor M1 and a wiper blade 7, which is driven by the wiper motor M1 to sweep across an outer surface of the rear window 4 in swing motion.

A rear washer nozzle N1 is provided just above the rear window 4 at the rear central position thereof. The rear washer nozzle N1 serves as a window washing nozzle. A nozzle opening of the rear washer nozzle N1 is oriented downward so that a washer fluid that has been supplied thereinto is ejected from the nozzle opening onto a surface of the rear window 4 to be swept.

A main pipe 8 is configured with a common pipe 8a and a first branch pipe 8b, which forms a main branch pipe. The rear washer nozzle N1 is connected to a washer pump P provided in the engine compartment at the front of the vehicle 1 via the main pipe 8. The washer pump P and a pump motor M2 together constitute an electric pump 20, which supplies the washer fluid stored in a tank T, which is also provided in the engine compartment, to the rear washer nozzle N1 via the main pipe 8. When a wiper washer switch SW1 provided at the driver's seat is operated, the pump motor M2 is driven to turn, thereby driving the washer pump P to feed the washer fluid from the tank T to the rear washer nozzle N1 through the main pipe 8.

An onboard camera 10 for monitoring a rear view is installed at a location further behind the rear wiper unit 6 outside a rear portion of the vehicle 1 in the first embodiment. The onboard camera 10 used in the first embodiment is a rear view camera for visually monitoring the rear view. An image picked up by the onboard camera 10 is transmitted as image data to the display DSP provided in the console panel of the vehicle 1. The display DSP provides an on-screen presentation of the image captured by the onboard camera 10 on the basis of the incoming image data.

When the shift lever 3 of the transmission 2 is shifted to the backup position (reverse position), the onboard camera 10 begins to perform image pickup operation and transmits the image data captured to the display DSP. The onboard camera 10 terminates the image pickup operation when the shift lever 3 is shifted from the backup position (reverse position) to any of the other gear positions.

A camera washer nozzle N2 is provided at a location adjacent to the onboard camera 10 and outside a rearward imaging angle of view of the onboard camera 10. The camera washer nozzle N2 serves as a backup camera washing nozzle. A nozzle opening of the camera washer nozzle N2 is oriented toward a glass window 10a (refer to FIG. 1), which covers a lens of the onboard camera 10 to protect the same from mud, dust and dirt, for instance. The camera washer nozzle N2 ejects the washer fluid, which has been supplied thereinto, from the nozzle opening onto the glass window 10a of the onboard camera 10.

The camera washer nozzle N2 is connected to a second branch pipe 8c, which branches out from the main pipe 8. The second branch pipe 8c is connected to the main pipe 8 in a rear part of the vehicle 1, and uses, as part of a fluid supply line, a portion of the main pipe 8 from the washer pump P to a pipe connecting point (branching point) in the rear part of the vehicle 1. A solenoid changeover valve 12 is arranged at this pipe branching point, where the second branch pipe 8c branches out from the main pipe 8. The solenoid changeover valve 12 serves as a changeover valve device. The solenoid changeover valve 12 selectively switches a flow channel of the washer fluid fed from the washer pump P to the camera washer nozzle N2 or to the rear washer nozzle N1.

The solenoid changeover valve 12, which is actuated as a result of manipulation of the shift lever 3 of the transmission 2 to the backup position (reverse position), connects the second branch pipe 8c and the main pipe 8 to each other. Specifically, the solenoid changeover valve 12 disconnects the rear washer nozzle N1 from the washer pump P and connects the camera washer nozzle N2 to the washer pump P. As a result, the camera washer nozzle N2 is brought into a state in which the washer pump P can feed the washer fluid from the tank T to the camera washer nozzle N2. Also, when the washer fluid is supplied from the tank T into the camera washer nozzle N2 via the main pipe 8 and the second branch pipe 8c by driving of the washer pump P, the washer fluid is ejected from the nozzle opening of the camera washer nozzle N2 onto the glass window 10a of the onboard camera 10.

When the shift lever 3 of the transmission 2 is placed at a position other than the backup position (reverse position), on the other hand, the solenoid changeover valve 12 is brought into an inactivated state. When in the inactivated state, the solenoid changeover valve 12 interrupts the connection between the second branch pipe 8c and the main pipe 8. In this state, the solenoid changeover valve 12 connects the rear washer nozzle N1 to the washer pump P via the main pipe 8. Therefore, the vehicular washing device is in a state in which the washer pump P can feed the washer fluid from the tank T to the rear washer nozzle N1 under normal conditions.

If the wiper washer switch SW1 provided near the driver's seat is manipulated in this state, the washer pump P operates to feed the washer fluid from the tank T into the rear washer nozzle N1 through the main pipe 8. The washer fluid is then ejected onto the rear window 4 from the nozzle opening of the rear washer nozzle N1.

The electrical configuration of the vehicular washing device structured as described above is now explained with reference to FIG. 2.

Referring to FIG. 2, the backup lamp BL located at the rear of the vehicle 1 has a first terminal, which is grounded, and a second terminal, which is connected in series with a backup lamp relay 11 located in the engine compartment at the front of the vehicle 1 via a lamp harness L1.

(Backup Lamp Relay 11)

The backup lamp relay 11 is a reed relay including a reed switch 11a and an excitation coil 11b. A positive terminal of the reed switch 11a is connected to a positive-side power line L0 via a fuse F1, whereas a negative terminal of the reed switch 11a is connected to the backup lamp BL via the lamp harness L1. The positive-side power line L0 is connected to a high-potential terminal of a battery BA via an ignition switch IG and a fuse F2, a low-potential terminal of the battery BA being grounded. The reed switch 11a is turned on (conducted) when the excitation coil 11b is excited by an electric current so that the backup lamp BL can be lit by a current. A wash control circuit 31 provided in the rear part of the vehicle 1 is connected to the aforementioned lamp harness L1 at the rear part of the vehicle 1. At an instant when the backup lamp BL is lit, a reverse state signal L, which is a signal indicating that the vehicle 1 is currently in reverse, is input into the wash control circuit 31.

A first terminal of the excitation coil 11b of the backup lamp relay 11 is connected to the positive terminal of the reed switch 11a, whereas a second terminal of the excitation coil 11b is connected to an electronic control unit (ECU) 17 of the vehicle 1 (hereinafter referred to as the vehicle ECU 17), which serves as a touch panel controlling section.

(Pump Motor M2)

The pump motor M2 constitutes part of the electric pump 20. A first terminal of the pump motor M2 is connected to the positive-side power line L0, whereas a second terminal of the pump motor M2 is connected to a pump relay 13, the wash control circuit 31 and the wiper washer switch SW1.

(Pump Relay 13)

The pump relay 13 is a reed relay including a reed switch 13a and an excitation coil 13b. A positive terminal of the reed switch 13a is connected to the second terminal of the pump motor M2 while a negative terminal of the reed switch 13a is grounded. The reed switch 13a is turned on (conducted) when the excitation coil 13b is excited by an electric current so that the pump motor M2, or the electric pump 20, is driven to operate by a current. A first terminal of the excitation coil 13b of the pump relay 13 is connected to the positive-side power line L0, whereas a second terminal of the excitation coil 13b is connected to the vehicle ECU 17.

(Vehicle ECU 17)

The vehicle ECU 17 carries out various kinds of processing operations. When a shift lever reverse signal RV indicating that the shift lever 3 of the transmission 2 has been shifted to the backup position (reverse position) is input, for example, the vehicle ECU 17 causes the second terminal of the excitation coil 11b to be grounded so that an electric current flows through the excitation coil 11b. More specifically, the vehicle ECU 17 causes the reed switch 11a to turn on so that the backup lamp BL is lit by a current via the lamp harness L1, and the signal (i.e., the reverse state signal L at a high (H) level) indicating that the vehicle 1 is currently in reverse is output to the wash control circuit 31.

Also, upon receiving the shift lever reverse signal RV, the vehicle ECU 17 displays the image captured by the onboard camera 10 and a camera wash control touch panel switch TSW on the display DSP.

Further, when the camera wash control touch panel switch TSW is manipulated (touched), the vehicle ECU 17 causes the second terminal of the excitation coil 13b to be grounded so as to energize the excitation coil 13b. Specifically, the vehicle ECU 17 causes the reed switch 13a to turn on so as to ground the second terminal of the pump motor M2, whereby the pump motor M2 (electric pump 20) is activated.

On the other hand, when the shift lever 3 is at a position other than the backup position (reverse position) and the shift lever reverse signal RV is not input, the vehicle ECU 17 does not energize the excitation coil 11b, causing the reed switch 11a to turn off, so that the backup lamp BL is extinguished and the H-level reverse state signal L is not output to the wash control circuit 31.

When the shift lever reverse signal RV is not input, the vehicle ECU 17 does not display the image captured by the onboard camera 10 but presents a map, for instance, on the display DSP. In this case, the onboard camera 10 does not present the aforementioned camera wash control touch panel switch TSW on-screen either.

(Wiper Washer Switch SW1)

The wiper washer switch SW1 is a switch for activating the wiper motor M1 and the pump motor M2 (electric pump 20). The vehicular washing device allows the driver to turn the wiper washer switch SW1 to one of positions marked OFF, WASH1 (abbreviated as WA1 in FIG. 2), INT (which stands for intermittent), ON and WASH2 (abbreviated as WA2 in FIG. 2). The vehicular washing device is configured such that, even if the driver releases the wiper washer switch SW1 after placing the same at the OFF, INT or ON position, the wiper washer switch SW1 is left at the position where the wiper washer switch SW1 is placed by the driver. The vehicular washing device is so configured that the wiper washer switch SW1 can be kept at the WASH1 position only while the driver holds the wiper washer switch SW1 at that position by applying a force and the wiper washer switch SW1 flips to the OFF position when the driver releases the wiper washer switch SW1. Similarly, the vehicular washing device is so configured that the wiper washer switch SW1 can be kept at the WASH2 position only while the driver holds the wiper washer switch SW1 at that position by applying a force and the wiper washer switch SW1 flips to the ON position when the driver releases the wiper washer switch SW1.

The wiper washer switch SW1 has an LS terminal, a C1 terminal, an E terminal and a W terminal. The second terminal of the pump motor M2, the pump relay 13 and the wash control circuit 31 are connected to the W terminal. The E terminal of the wiper washer switch SW1 is grounded. The LS terminal and the C1 terminal of the wiper washer switch SW1 are connected to an LS terminal and a C1 terminal of a relay assembly 42 incorporated in a wiper motor assembly 41, which will be described below, respectively.

In a state where the wiper washer switch SW1 is turned to the OFF position, the individual terminals thereof are not connected to one another. In a state where the wiper washer switch SW1 is placed at the WASH1 position (interlocking operation), the E terminal is connected to the W terminal. In a state where the wiper washer switch SW1 is placed at the INT position, the C1 terminal is connected to the E terminal. In a state where the wiper washer switch SW1 is turned to the ON position, the LS terminal is connected to the E terminal. In a state where the wiper washer switch SW1 is placed at the WASH2 position, the LS terminal, the E terminal and the W terminal are connected together.

(Wash Control Circuit 31)

The wash control circuit 31 is connected to the lamp harness L1 as discussed above. The reverse state signal L which is at the H level when the vehicle 1 is in reverse is input into the wash control circuit 31. As mentioned in the above discussion, the wash control circuit 31 is connected to the second terminal of the pump motor M2, that is, to the pump relay 13 and the W terminal of the wiper washer switch SW1. A pump running signal W1 which is set to a low (L) level when the pump motor M2 is in an activated state is input into the wash control circuit 31.

The wash control circuit 31 is connected to a W terminal of the relay assembly 42 of the wiper motor assembly 41. The wash control circuit 31 outputs an L-level wiper interlock signal W2 to this W terminal only when the reverse state signal L is not input (i.e., the reverse state signal L is at the L level) and the pump running signal W1 is input (i.e., the pump running signal W1 is at the L level). This means, expressed differently, that the wash control circuit 31 outputs the L-level wiper interlock signal W2 to the W terminal when the L-level pump running signal W1 is input under conditions where the reverse state signal L set to the H level is not input, and when the L-level pump running signal W1 is not input, the wash control circuit 31 does not output the L-level wiper interlock signal W2, that is, the wash control circuit 31 sets the wiper interlock signal W2 at the H level. Under conditions where the reverse state signal L set to the H level is input, the wash control circuit 31 does not output the L-level wiper interlock signal W2, that is, the wash control circuit 31 sets the wiper interlock signal W2 at the H level, regardless of whether the L-level pump running signal W1 is input or not.

The wash control circuit 31 is connected to a base terminal of an NPN transistor Tr1. When the reverse state signal L is input, or when the reverse state signal L is at the H level, the wash control circuit 31 outputs an H-level valve actuating signal V to the base terminal of the transistor Tr1 regardless of whether the pump running signal W1 is input or not (i.e., the pump running signal W1 is at the L or H level).

(Solenoid Changeover Valve 12)

The solenoid changeover valve 12 has a built-in changeover valve Ba and excitation coil Bb. When the excitation coil Bb is not energized, or in an initial stage, the changeover valve Ba is not actuated and the solenoid changeover valve 12 keeps the vehicular washing device in a state in which the electric pump 20 (washer pump P) is connected to the rear washer nozzle N1 through the main pipe 8. When the excitation coil Bb is energized, the changeover valve Ba is actuated, the electric pump 20 (washer pump P) is connected to the camera washer nozzle N2 through the second branch pipe 8c and the solenoid changeover valve 12 maintains the vehicular washing device in this state while the excitation coil Bb is energized.

A first terminal of the excitation coil Bb of the solenoid changeover valve 12 is connected to the positive-side power line L0 and a second terminal of the excitation coil Bb is grounded via the transistor Tr1. Therefore, when the H-level valve actuating signal V is input from the wash control circuit 31 into the base terminal of the transistor Tr1, the excitation coil Bb is energized and the electric pump 20 (washer pump P) is connected to the camera washer nozzle N2.

(Wiper Motor Assembly 41)

The wiper motor assembly 41 includes a wiper motor main body 43 and the aforementioned relay assembly 42, which are combined to form a single, modularized unit.

(Wiper Motor Main Body 43 (Wiper Motor M1 and Cam Switch 44)

The wiper motor main body 43 includes the wiper motor M1 and a cam switch 44, which constitutes part of an automatic returning system. The automatic returning system is a system configured to move the wiper blade 7 back to and stops the same at its home position even if the wiper washer switch SW1 is turned to the OFF position when the wiper blade 7 is at a position other than the home position.

A first terminal of the wiper motor M1 is connected to a +1 terminal of the wiper motor main body 43 while a second terminal of the wiper motor M1 is connected to an E terminal of the wiper motor main body 43 via a circuit breaker CB, the E terminal being a grounded terminal.

The cam switch 44 has an a contact, a b contact, a c contact which is a common contact, and a movable contact 44a. The a contact is connected to the aforementioned positive-side power line L0 via a +B terminal of the wiper motor main body 43, for instance. The b contact is grounded via the E terminal of the wiper motor main body 43, for instance. The c contact serving as the common contact is connected to an S terminal of the wiper motor main body 43. The movable contact 44a which becomes movable when the wiper motor M1 is actuated connects the c contact serving as the common contact to one of the a and b contacts.

More specifically, the movable contact 44a connects the c contact to the a contact, or to the positive-side power line L0, when the wiper blade 7 is at a position other than the home position. When the wiper blade 7 is set to the home position, the movable contact 44a connects the c contact to the b contact, or to the ground.

(Relay Assembly 42)

The relay assembly 42 includes a wiper driving relay 45 and a control integrated circuit (IC) 46. The relay assembly 42 drives the wiper motor M1 on the basis of an externally input signal.

(Wiper Driving Relay 45)

The wiper driving relay 45 is a relay having an a contact, a b contact, a c contact (common contact), a movable contact 45a and an excitation coil 45b. The a contact is connected to the S terminal of the wiper motor main body 43. The b contact is connected to the positive-side power line L0 via the +B terminal of the wiper motor main body 43, the +B terminal being an external terminal of the wiper motor assembly 41 (relay assembly 42). The c contact (common contact) is connected to the +1 terminal of the wiper motor main body 43. The movable contact 45a becomes ON when the excitation coil 45b is energized and excited, whereby the c contact is connected to the b contact (i.e., to the positive-side power line L0). The movable contact 45a becomes OFF when the excitation coil 45b is de-energized, whereby the c contact is connected to the a contact (i.e., the S terminal of the wiper motor main body 43).

Operating in the aforementioned manner, the wiper driving relay 45 connects the first terminal of the wiper motor M1 to the positive-side power line L0 when turned on in order to actuate the wiper motor M1, and connects the cam switch 44 to the first terminal of the wiper motor M1 when turned off so that automatic returning operation is performed.

A first terminal of the excitation coil 45b of the wiper driving relay 45 is connected to a cathode of a diode 47 of which anode is connected to the positive-side power line L0 and a second terminal of the excitation coil 45b is connected to a 7th pin of the control IC 46 (i.e., pin 7 among pins of the control IC 46 that are arranged along an outer periphery thereof and denoted 1 through 10).

(Control IC 46)

The control IC 46 is a logic IC. Pins 8 to 10 of the control IC 46 are connected to the W, C1 and the LS terminals of the aforementioned wiper motor assembly 41 (i.e., the relay assembly 42 thereof) via resistors R1 to R3, which are voltage-dividing resistor, respectively. The W, C1 and the LS terminals mentioned above are connected to the cathode of the diode 47 via resistors R4-R6, respectively. Pin 5 of the control IC 46 is also connected to the cathode of the diode 47 via resistor R7 and grounded via parallel-connected capacitors Ca and Cb and a grounding (GND) terminal which is the external terminal of the wiper motor assembly 41 (relay assembly 42). Unused pins (pins 1 to 4 and 6) of the control IC 46 are grounded via another GND terminal which is the external terminal of the wiper motor assembly 41 (relay assembly 42).

When an L-level wiper drive signal K1 is input from the wiper washer switch SW1 into pin 10 of the control IC 46, the control IC 46 energizes the excitation coil 45b by grounding the second terminal of the excitation coil 45b of the wiper driving relay 45 to turn on the wiper driving relay 45 (or connect the movable contact 45a to the b terminal) only during a time period when the signal K1 is input.

When an L-level intermittent wiper operation signal K2 is input from the wiper washer switch SW1 into pin 9 of the control IC 46, the control IC 46 grounds the second terminal of the excitation coil 45b of the wiper driving relay 45 at constant intervals (e.g., 3-second intervals) only during a time period when the signal K2 is input. Specifically, the control IC 46 alternates the excitation coil 45b between energized and de-energized states at the constant intervals (e.g., 3-second intervals) so that the wiper driving relay 45 becomes ON (the movable contact 45a is connected to the b terminal) at the constant intervals (e.g., 3-second intervals).

When the L-level wiper interlock signal W2 is input from the wash control circuit 31 into pin 8 of the control IC 46, the control IC 46 grounds the second terminal of the excitation coil 45b of the wiper driving relay 45 to energize the excitation coil 45b so that the wiper driving relay 45 becomes ON (the movable contact 45a is connected to the b terminal) only during a time period when the signal W2 is input.

Operation of the first embodiment (vehicular washing device) thus configured will now be described.

(When the Shift Lever 3 is at a Position Other than the Backup Position (Reverse Position))

When the shift lever 3 is currently at a position other than the backup position (reverse position), for example, the backup lamp BL is off and the H-level reverse state signal L is not input into the wash control circuit 31 (the reverse state signal L is at the L level). In this state, the wash control circuit 31 outputs the input pump running signal W1 as it is as the wiper interlock signal W2 (which is at the L level when the signal W1 is at the L level, the H level when the signal W1 is at the H level). In this state, the wash control circuit 31 does not output the H-level valve actuating signal V to the base terminal of the transistor Tr1 and the electric pump 20 (washer pump P) is kept connected to the rear washer nozzle N1.

When the wiper washer switch SW1 is turned to the WASH1 position (interlocking operation), for example, the W terminal of the wiper washer switch SW1 is connected to the E terminal (ground) so as to activate the pump motor M2 (electric pump 20). This causes the rear washer nozzle N1 to eject the washer fluid onto the rear window 4.

While the wiper washer switch SW1 is placed at the WASH1 position (interlocking operation), the pump running signal W1 at the L level is input into the wash control circuit 31 and, thus, the wash control circuit 31 outputs the L-level wiper interlock signal W2 to the control IC 46, causing the control IC 46 to turn on the wiper driving relay 45 (or connect the movable contact 45a to the b terminal). As a result, the wiper motor M1 is driven so that the wiper blade 7 sweeps the rear window 4 while the wiper washer switch SW1 is kept at the WASH1 position (interlocking operation), or more particularly, until this interlocking operation is terminated and the automatic returning operation performed by the cam switch 44 is completed.

When the wiper washer switch SW1 is turned to the INT position, for example, the C1 terminal of the wiper washer switch SW1 is connected to the E terminal (ground). Consequently, the L-level intermittent wiper operation signal K2 is input into the control IC 46 so that the control IC 46 turns on the wiper driving relay 45 (to connect the movable contact 45a to the b terminal) at the constant intervals (e.g., 3-second intervals). This causes the wiper motor M1 to operate at the constant intervals (e.g., 3-second intervals) so that the wiper blade 7 swipes the rear window 4 accordingly (intermittent operation).

When the wiper washer switch SW1 is turned to the ON position, for example, the LS terminal of the wiper washer switch SW1 is connected to the E terminal (ground). Consequently, the L-level wiper drive signal K1 is input into the control IC 46 so that the control IC 46 turns on the wiper driving relay 45 (to connect the movable contact 45a to the b terminal). This causes the wiper motor M1 to operate (continuous operation) so that the wiper blade 7 sweeps the rear window 4.

When the wiper washer switch SW1 is turned from the ON position to the WASH2 position, for example, the LS terminal of the wiper washer switch SW1 and also the W terminal thereof are connected to the E terminal (ground), so that the pump motor M2 (electric pump 20) is activated while the wiper motor M1 is driven to operate (continuous operation). As a result, the wiper blade 7 sweeps the rear window 4 and the rear washer nozzle N1 ejects the washer fluid onto the rear window 4.

(When the Shift Lever 3 is at the Backup Position (Reverse Position))

When the shift lever 3 is currently at the backup position (reverse position), for example, the backup lamp BL is on and the H-level reverse state signal L is input into the wash control circuit 31. In this state, the wash control circuit 31 does not output the L-level wiper interlock signal W2 (keeps the wiper interlock signal W2 at the H level) regardless of whether the pump running signal W1 is input or not. In this state, the wash control circuit 31 outputs the H-level valve actuating signal V to the base terminal of the transistor Tr1 and the electric pump 20 (washer pump P) is kept connected to the camera washer nozzle N2.

When the wiper washer switch SW1 is turned to the WASH1 position (interlocking operation), for example, the W terminal of the wiper washer switch SW1 is connected to the E terminal (ground) so as to activate the pump motor M2 (electric pump 20). This causes the camera washer nozzle N2 to eject the washer fluid onto the glass window 10a of the onboard camera 10.

Even when the wiper washer switch SW1 is placed at the WASH1 position (interlocking operation) and L-level pump running signal W1 is input into the wash control circuit 31, the wash control circuit 31 does not transmit the L-level wiper interlock signal W2 to the control IC 46. Therefore, the control IC 46 leaves the wiper driving relay 45 in an OFF state (in which the movable contact 45a is connected to the a terminal) in this case. This serves to prevent the wiper blade 7 from sweeping across the rear window 4 in a dried state, for example.

When the wiper washer switch SW1 is turned to the INT position, for example, the wiper motor M1 is driven to operate at the constant intervals (e.g., 3-second intervals) so that the wiper blade 7 sweeps the rear window 4 accordingly (intermittent operation) as is the case where the shift lever 3 is at a position other than the backup position (reverse position).

When the wiper washer switch SW1 is turned to the ON position, for example, the wiper motor M1 is driven to operate so that the wiper blade 7 sweeps the rear window 4 (continuous operation) as is the case where the shift lever 3 is at a position other than the backup position (reverse position).

When the wiper washer switch SW1 is turned from the ON position to the WASH2 position, for example, the LS terminal of the wiper washer switch SW1 and also the W terminal thereof are connected to the E terminal (ground), so that the pump motor M2 (electric pump 20) is activated while the wiper motor M1 is driven to operate (continuous operation). As a result, the wiper blade 7 sweeps the rear window 4 and the camera washer nozzle N2 ejects the washer fluid onto the glass window 10a of the onboard camera 10.

Characteristic advantages of the first embodiment thus far described can be summarized as follows.

(1) The vehicular washing device is provided with the solenoid changeover valve 12. The solenoid changeover valve 12 can selectively switch the flow channel of the washer fluid from the electric pump 20 (washer pump P) to the rear washer nozzle N1 or to the camera washer nozzle N2. Therefore, the vehicular washing device of this embodiment can wash the onboard camera 10 (glass window 10a) through the efficient use of the existing electric pump 20 and tank T for window washing purposes. An advantage that results from this approach is that the vehicular washing device of the embodiment requires a small installation space and can be made inexpensive.

In a state where the H-level reverse state signal L indicating that the vehicle 1 is currently in reverse is not input into the wash control circuit 31, the solenoid changeover valve 12 is kept switched to the side of the rear washer nozzle N1. It is now allowed to operate the wiper motor M1 by manipulating the wiper washer switch SW1 to initiate the interlocking operation (i.e., by turning the wiper washer switch SW1 to WASH1, abbreviated as WA1) in order to simultaneously operate the electric pump 20 (pump motor M2) and the wiper motor M1. It is therefore possible to activate both the electric pump 20 (pump motor M2) and the wiper motor M1 by manipulating the wiper washer switch SW1 to initiate the interlocking operation (executed by selecting WA1) in order to eject the washer fluid onto the rear window 4 and sweep the rear window 4 by the wiper blade 7 in an interlocked fashion.

When the reverse state signal L is input into the wash control circuit 31, the solenoid changeover valve 12 is switched from the rear washer nozzle N1 to the camera washer nozzle N2, and the aforementioned interlocking operation of the wiper motor M1 (initiated by selecting WA1) is inhibited. Therefore, if the wiper washer switch SW1 is manipulated (turned to WA1) to initiate the interlocking operation under conditions where the H-level reverse state signal 1 is input into the wash control circuit 31, for example, the electric pump 20 (washer pump P) will be caused to operate with the solenoid changeover valve 12 switched to the camera washer nozzle N2 but the wiper motor M1 will not be activated. Consequently, it is possible to wash the glass window 10a of the onboard camera 10 by spraying it with the washer fluid, but the wiper motor M1 cannot be activated. Accordingly, the wiper blade 7 is kept from sweeping across the rear window 4 in a dried state, for example.

(2) When the vehicle 1 is in reverse, the display DSP presents an image picked up by the onboard camera 10 as well as the camera wash control touch panel switch TSW. Then, if the driver watching the screen image on the display DSP notices that the glass window 10a needs to be cleaned, the driver can easily wash the glass window 10a by just manipulating (touching) the touch panel switch TSW. Thus, the driver can wash the glass window 10a of the onboard camera 10 in a precise and prompt manner in such cases without the need to operate a complex lever integrally incorporating the wiper washer switch SW1 capable of initiating the aforementioned interlocking operation (executed by selecting WA1), for example, and without the risk of committing an operational error or becoming confused in operation.

(3) When the driver moves the shift lever 3 to the reverse position with the intent to back up the vehicle 1, the flow channel of the washer fluid from the electric pump 20 is switched to the camera washer nozzle N2. Then, the driver can immediately wash the glass window 10a of the onboard camera 10 by further operating the wiper washer switch SW1, for instance, with his or her own intention.

(4) Aiming to efficiently exploit the fact that the backup lamp BL installed at the rear of the vehicle 1 is lit when the shift lever 3 is moved to the reverse position, part of electric power (current) supplied to the backup lamp BL is used as the reverse state signal L. This approach of the embodiment makes it possible to significantly shorten a signal line from the shift lever 3 to the wash control circuit 31 located in the rear part of the vehicle 1 as compared to a case where the power for individual circuit elements are supplied through parallel lines (comparative example).

(5) The wash control circuit 31 is so configured as to enable activation of the wiper motor M1 if the wiper washer switch SW1 is turned to any of the positions marked INT, ON and WASH2 (wiper actuating operation) even when the H-level reverse state signal L is being input. This means that the wash control circuit 31 is not configured to totally inhibit activation of the wiper motor M1 when the H-level reverse state signal L is input regardless of whether the wiper washer switch SW1 is otherwise operated. For this reason, activation of the wiper motor M1 is enabled when the aforementioned wiper actuating operation is performed even when the H-level reverse state signal L is being input and, thus, the wiper motor M1 can be normally operated in this case. Therefore, if the driver performs the wiper actuating operation (turning to one of the INT, ON and WASH2 positions) with his or her own intention when reversing in the rain, for example, it is possible to cause the wiper blade 7 to normally sweep the rear window 4.

The foregoing first embodiment may be modified.

In the first embodiment thus far discussed, the vehicular washing device is so configured that the display DSP presents the image captured by the onboard camera 10 together with the camera wash control touch panel switch TSW when the vehicle 1 is in reverse, so that the driver can activate the electric pump 20 by manipulating the camera wash control touch panel switch TSW as well. The embodiment is not limited to this configuration but may be reconfigured so as not to include the above-described arrangement.

In the foregoing first embodiment, the vehicular washing device is configured to feed part of the electric power (current) supplied to the backup lamp BL to the wash control circuit 31 as the reverse state signal L. The embodiment is not limited to this configuration but may employ a modification of other wiring configuration. If, for example, the vehicle 1 is provided with a warning buzzer located at the rear for alerting to a backup (reversing) state, the vehicular washing device may be so configured that the warning buzzer sounds an alarm when the shift lever 3 is moved to the reverse position and part of an electric current supplied to the warning buzzer is fed into the wash control circuit 31 as the reverse state signal L. Needless to say, the embodiment may be reconfigured in such a manner that when the shift lever 3 is moved to the reverse position, an electric current is supplied to the wash control circuit 31 as the reverse state signal L independently of the current supplied to the backup lamp BL or the warning buzzer.

In the foregoing first embodiment, the reverse state signal L indicating that the vehicle 1 is currently in reverse is a signal output on the basis of the position of the shift lever 3 constituting part of the transmission 2. The reverse state signal L is not limited to such a signal, however. For example, the reverse state signal L may be a signal output on the basis of the fact that the vehicle 1 is actually backing up (the tires are turning in the reverse direction).

Technical ideas obtainable from the above described embodiment and modifications are listed below, together with advantages thereof.

In the aforementioned vehicular washing device, the wiper washer switch is configured to have capability to execute the interlocking operation, in which the electric pump and the wiper motor are operated at the same time, as well as the wiper actuating operation for operating the wiper motor alone, while the wash control circuit enables activation of the wiper motor if the wiper actuating operation is executed even when the reverse state signal is being input.

According to this configuration, activation of the wiper motor is enabled if the wiper actuating operation is executed even when the reverse state signal is being input, and then the driver is allowed to normally operate the wiper motor. Therefore, if the driver performs the wiper actuating operation with his or her own intention when reversing in the rain, for example, it is possible to sweep the vehicle window by normally activating the wiper.

(Second Embodiment)

Figure 3:
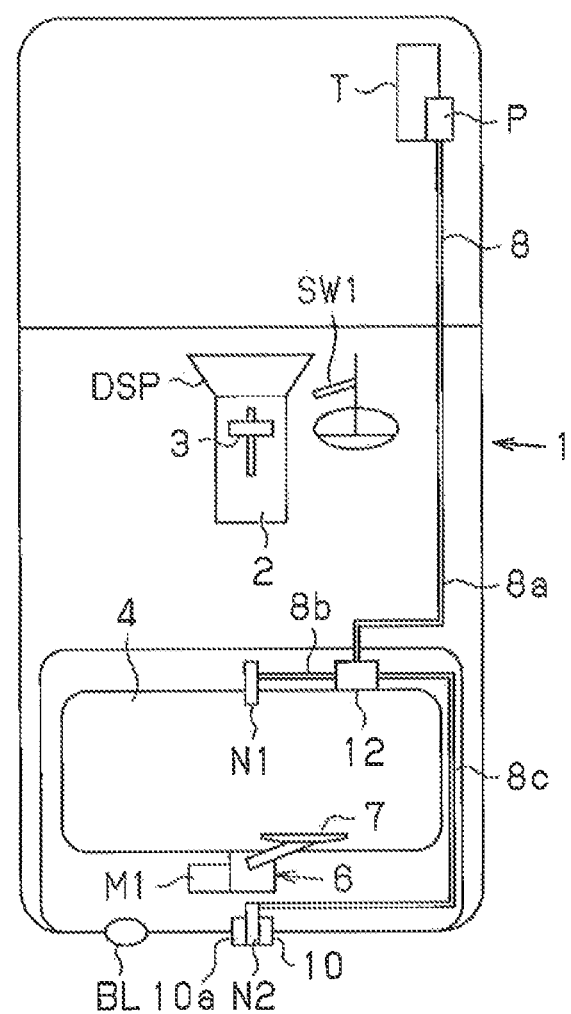
FIG. 3 is a schematic configuration diagram of a vehicle provided with a vehicular washing device according to a second embodiment.
Figure 4:
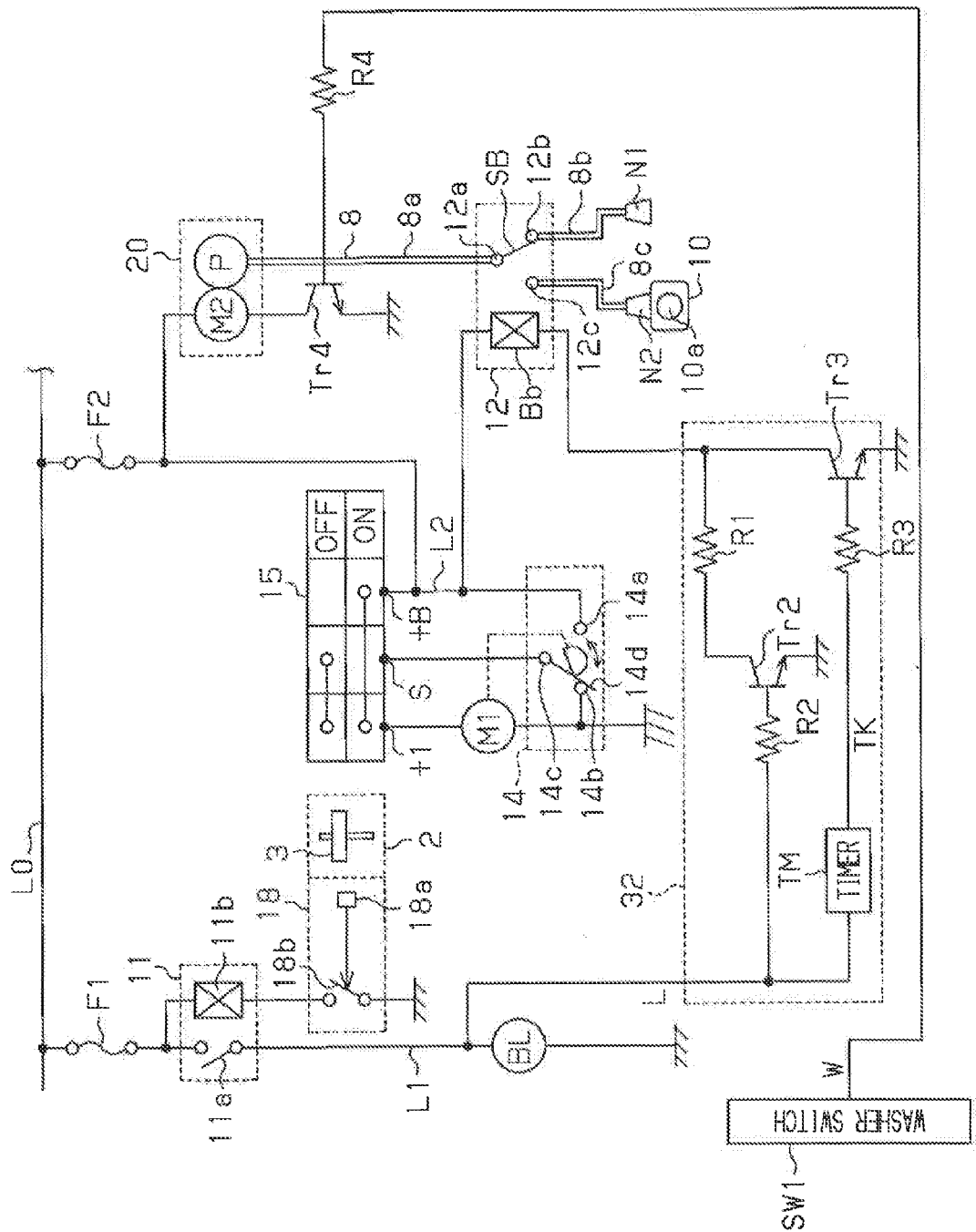
FIG. 4 is an electric circuit diagram used for explaining the electrical configuration of the vehicular washing device of the second embodiment.
Figure 5:
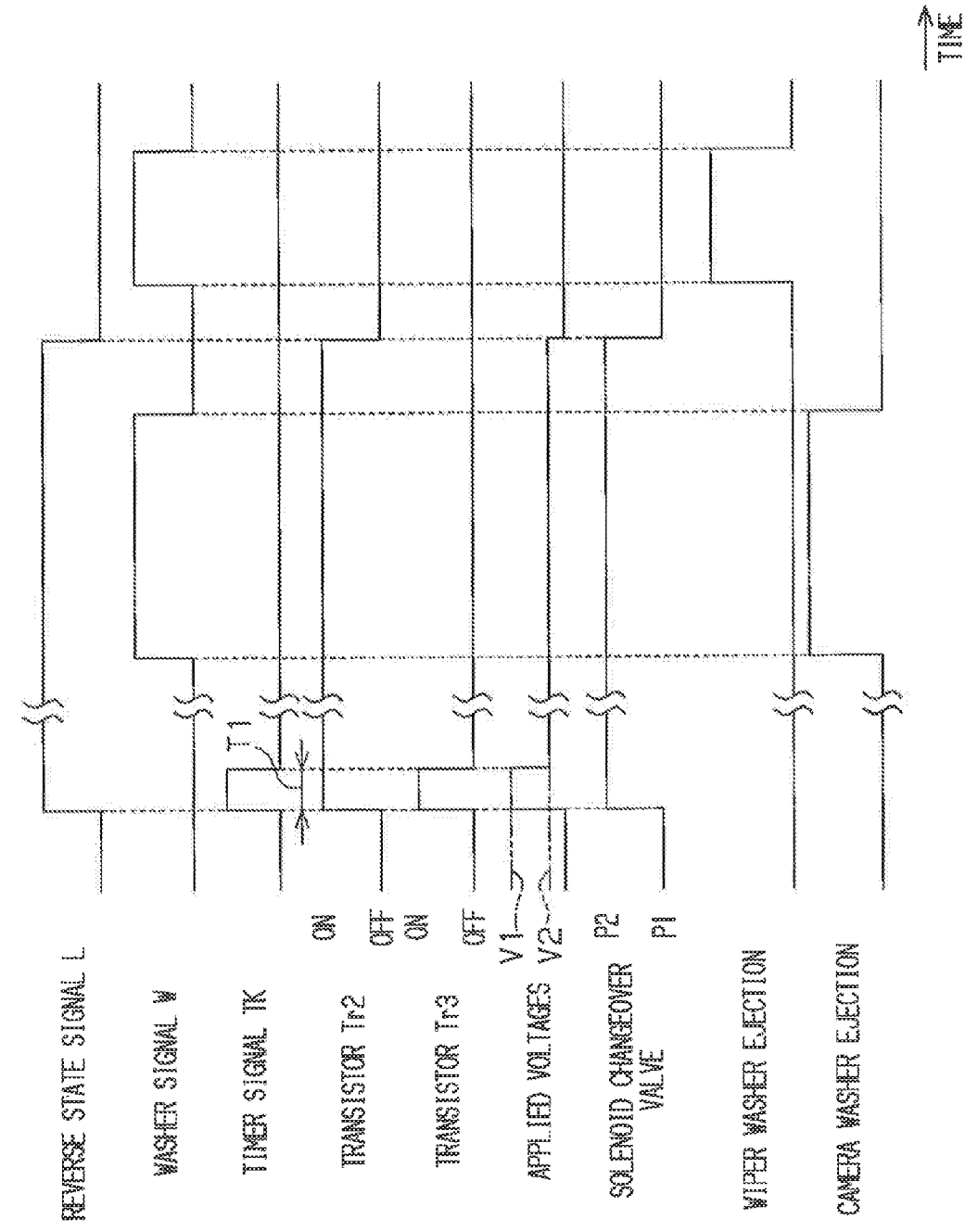
FIG. 5 is a time chart depicting individual signals and related operations that occur in the vehicular washing device of the second embodiment.

A vehicular washing device according to a second embodiment of this disclosure is described hereunder with reference to FIGS. 3 to 5.

As depicted in FIG. 3, a vehicle 1 is provided with a shift lever 3 of a transmission 2. The shift lever 3 is located beside the driver's seat. As illustrated in FIG. 1, the transmission 2 alters the gear ratio of the vehicle 1.

Installed in the console panel of the vehicle 1 is a display DSP, which is a display device of a navigation system used for on-screen presentation of the vehicle's current position, a map and other information.

There is provided a rear wiper unit 6 at a rear central position of the vehicle 1 below a rear window 4, which is one of vehicle windows. The rear wiper unit 6 is provided with a wiper motor M1, which serves as a rear wiper motor and a wiper blade 7, which is driven by the wiper motor M1 to sweep across an outer surface of the rear window 4 in swing motion.

A rear washer nozzle N1 is provided just above the rear window 4 at the rear central position thereof. The rear washer nozzle N1 serves as a window washing nozzle. A nozzle opening of the rear washer nozzle N1 is oriented downward toward the rear window 4 to eject the washer fluid onto a surface of the rear window 4 to be swept.

The rear washer nozzle N1 is connected to a washer pump P provided in the engine compartment at the front of the vehicle 1 via a main pipe 8. The washer pump P is a pump that supplies the washer fluid stored in a tank T, which is also provided in the engine compartment, to the rear washer nozzle N1 via the main pipe 8. When a wiper washer switch SW1 provided at the driver's seat is operated, the washer pump P, which is activated as a pump motor M2 (refer to FIG. 4) is driven to turn, feeds the washer fluid from the tank T to the rear washer nozzle N1 through the main pipe 8 (including a common pipe 8a and a first branch pipe 8b). In the second embodiment, the washer pump P and the pump motor M2 together constitute an electric pump 20.

An onboard camera 10 for monitoring a rear view is installed at a location further behind the rear wiper unit 6 outside a rear portion of the vehicle 1 in the second embodiment. The onboard camera 10 used in the second embodiment is a rear view camera for visually monitoring the rear view. An image picked up by the onboard camera 10 is transmitted as image data to the display DSP. The display DSP provides an on-screen presentation of the image captured by the onboard camera 10 on the basis of the incoming image data.

When the shift lever 3 of the transmission 2 is shifted to the backup position (reverse position), the onboard camera 10 begins to perform image pickup operation and transmits the image data captured to the display DSP. The onboard camera 10 terminates the image pickup operation when the shift lever 3 is shifted from the backup position (reverse position) to any of the other gear positions.

A camera washer nozzle N2 is provided at a location adjacent to the onboard camera 10 and outside a rearward imaging angle of view of the onboard camera 10. The camera washer nozzle N2 serves as a camera washing nozzle. A nozzle opening of the camera washer nozzle N2 is oriented toward a glass window 10a, which constitutes a capturing surface covering a lens of the onboard camera 10 to protect the same from mud, dust and dirt, for instance. The camera washer nozzle N2 ejects the washer fluid onto the glass window 10a of the onboard camera 10.

The camera washer nozzle N2 is connected to a second branch pipe 8c that branches out from the main pipe 8 (common pipe 8a), which connects the washer pump P to the rear washer nozzle N1. The second branch pipe 8c is connected to the main pipe 8 in a rear part of the vehicle 1, and uses, as part of a fluid supply line, a portion of the main pipe 8 from the washer pump P to a pipe connecting point (branching point) in the rear part of the vehicle 1. A solenoid changeover valve 12 is arranged at this pipe branching point, where the second branch pipe 8c branches out from the main pipe 8. The solenoid changeover valve 12 serves as a solenoid changeover valve device. The solenoid changeover valve 12 can keep a flow channel of the washer fluid running from the washer pump P switched from the rear washer nozzle N1 to the camera washer nozzle N2 during a time period when a voltage is applied (i.e., the solenoid changeover valve 12 is energized).

Actuated as a result of application of a voltage (electrical conduction) at a timing discussed below due to manipulation of the shift lever 3 of the transmission 2 to the backup position (reverse position), the solenoid changeover valve 12 connects the second branch pipe 8c and the main pipe 8 (common pipe 8a) to each other. Specifically, the solenoid changeover valve 12 interrupts a connection between the rear washer nozzle N1 and the washer pump P and establishes a connection between the camera washer nozzle N2 and the washer pump P. Consequently, the camera washer nozzle N2 is brought into a state in which the washer pump P can feed the washer fluid from the tank T to the camera washer nozzle N2.

If the wiper washer switch SW1 is manipulated in this state, the washer pump P is activated to feed the washer fluid from the tank T into the camera washer nozzle N2 through the common pipe 8a and the second branch pipe 8c. Then, the washer fluid is ejected onto the glass window 10a of the onboard camera 10 from the nozzle opening of the camera washer nozzle N2.

When the shift lever 3 of the transmission 2 is placed at a position other than the backup position (reverse position), on the other hand, no voltage is applied to the solenoid changeover valve 12 (i.e., the solenoid changeover valve 12 is not energized) so that the solenoid changeover valve 12 is kept in an inactivated state. When in the inactivated state, the solenoid changeover valve 12 interrupts the connection between the second branch pipe 8c and the common pipe 8a, and interconnects the rear washer nozzle N1 and the washer pump P via the common pipe 8a and the first branch pipe 8b. Therefore, the vehicular washing device is in a state in which the washer pump P can feed the washer fluid from the tank T to the rear washer nozzle N1 under normal conditions.

If the wiper washer switch SW1 is manipulated in this state, the washer pump P is activated to feed the washer fluid from the tank T into the rear washer nozzle N1 through the main pipe 8. Then, the washer fluid is ejected onto the rear window 4 from the nozzle opening of the rear washer nozzle N1.

The electrical configuration of the vehicular washing device structured as described above is now explained with reference to FIG. 4.

Referring to FIG. 4, the backup lamp BL located at the rear of the vehicle 1 has a first terminal, which is grounded, and a second terminal, which is connected in series with a backup lamp relay 11 located in the engine compartment at the front of the vehicle 1 via a lamp harness L1.

(Backup Lamp Relay 11)

The backup lamp relay 11 is a reed relay including a reed switch 11a and an excitation coil 11b. A positive terminal of the reed switch 11a is connected to a positive-side power line L0 via a fuse F1, the positive-side power line L0 being connected to a positive terminal of a battery, whereas a negative terminal of the reed switch 11a is connected to the backup lamp BL via the lamp harness L1. The reed switch 11a is turned on (conducted) when the excitation coil 11b is energized and excited by an electric current so that the backup lamp BL can be lit by a current. A voltage reduction controlling section 32 provided as a valve controlling section in the rear part of the vehicle 1 is connected to the aforementioned lamp harness L1. At an instant when the backup lamp BL is lit, a reverse state signal L indicating that the vehicle 1 is in reverse, that is, the vehicle 1 is in a ready-to-reverse state, is input into the voltage reduction controlling section 32.

A first terminal of the excitation coil 11b of the backup lamp relay 11 is connected to the positive terminal of the reed switch 11a, whereas a second terminal of the excitation coil 11b is connected to a position sensor 18.

(Position Sensor 18)

The position sensor 18 is a sensor for detecting that the shift lever 3 of the transmission 2 is placed at the backup position, or the reverse position. The position sensor 18 includes a sensing section 18a and an on/off switch 18b. The sensing section 18a is configured with a sensing device located at the backup position, or the reverse position, of the shift lever 3. The open/close switch 18b is made up of a switching transistor, which turns on and off in response to a sensing signal received from the sensing section 18a.

When the shift lever 3 is at the reverse position, the sensing section 18a outputs the sensing signal, which causes the open/close switch 18b to turn on, or become closed, to the open/close switch 18b. When the shift lever 3 is at a position other than the reverse position, the sensing section 18a does not output any sensing signal, thereby causing the open/close switch 18b to turn off, or become open.

A first terminal of the open/close switch 18b is connected to the excitation coil 11b of the backup lamp relay 11, whereas a second terminal of the open/close switch 18b is grounded. When the sensing section 18a detects that the shift lever 3 is placed at the reverse position, the open/close switch 18b turns on to energize the excitation coil 11b. This means that the open/close switch 18b causes the reed switch 11a to turn on (conduct) to flow a current into the backup lamp BL through the lamp harness L1 in this case, thereby causing the voltage reduction controlling section 32 to output the reverse state signal L indicating that the vehicle 1 is currently in reverse.

When the sensing section 18a detects that the shift lever 3 is at a position other than the reverse position, on the other hand, the open/close switch 18b turns off to de-energize the excitation coil 11b. This means that the open/close switch 18b causes the reed switch 11a to turn off to interrupt the current that flows through the lamp harness L1 in this case, so that the backup lamp BL will not light.

(Voltage Reduction Controlling Section 32)

Generally, the voltage reduction controlling section 32 operates as depicted in FIG. 5. Specifically, when the reverse state signal L is input, the voltage reduction controlling section 32 applies a switching voltage V1 to the solenoid changeover valve 12 for a predetermined first time period T1. During a period when the reverse state signal L continues to be input after the first time period T1 has elapsed, the voltage reduction controlling section 32 begins to apply a switched state retaining voltage V2 instead of the switching voltage V1, the switched state retaining voltage V2 being lower than the switching voltage V1.

More specifically, the voltage reduction controlling section 32 applies the switched state retaining voltage V2 obtained by lowering the initially applied switching voltage V1. As depicted in FIG. 4, the voltage reduction controlling section 32 includes a voltage-dividing resistor R1, an NPN transistor Tr2, which serves as a first switching element, an NPN transistor Tr3, which serves as a second switching element, and a timer TM.

A first terminal of the voltage-dividing resistor R1 is connected to a ground-side terminal of an excitation coil Bb of the solenoid changeover valve 12, whereas a second terminal of the voltage-dividing resistor R1 is grounded, or connected to the ground, via the transistor Tr2. The lamp harness L1 is connected to a base terminal of the transistor Tr2 via a resistor R2. The transistor Tr2 is kept on while the H-level reverse state signal L is being input.

The ground-side terminal of the excitation coil Bb of the solenoid changeover valve 12 is grounded, or connected to the ground, via the transistor Tr3. The lamp harness L1 is connected to a base terminal of the transistor Tr3 via a resistor R3 and the timer TM. The transistor Tr3 is kept on while an H-level timer signal TK is input. As depicted in FIG. 5, the timer TM outputs the H-level timer signal TK for the first time period T1 when the H-level reverse state signal L is input, and then the timer TM stops outputting the timer signal TK, or outputs an L-level timer signal TK, even if the reverse state signal L continues to be input after the first time period T1 has elapsed.

(Wiper Motor M1)

The wiper motor M1 drives the rear wiper unit 6. A first terminal of the wiper motor M1 is connected to a rear wiper switch 15. A +B terminal of the rear wiper switch 15 is connected to the positive-side power line L0 via a fuse F2 located in the engine compartment at the front of the vehicle 1. On the other hand, a second terminal of the wiper motor M1 is grounded.

Incorporated inside the wiper motor M1 is a cam switch 14, which constitutes part of an automatic returning system for the rear wiper unit 6. The automatic returning system is a system configured to move the wiper blade 7 back to and stops the same at its home position even if the rear wiper switch 15 is placed at the OFF position when the wiper blade 7 is at a position other than the home position.

(Cam Switch 14)

The cam switch 14 has an a contact 14a, a b contact 14b, a common contact 14c, and a movable contact 14d. The a contact 14a is connected to a motor harness L2 and then to the positive-side power line L0 via the fuse F2. The b contact 14b is connected to the second terminal of the wiper motor M1 and grounded as well. A first terminal of the movable contact 14d is connected to the common contact 14c, which is connected to an S terminal of the rear wiper switch 15. The movable contact 14d can move, keeping pace with swing motion produced by the wiper motor M1. As the movable contact 14d can move in this way, a second terminal of the movable contact 14d remains connected to one of the a contact 14a and the b contact 14b.

More specifically, the movable contact 14d is connected to the a contact 14a when the wiper blade 7 is at a position other than the home position. Therefore, even if the rear wiper switch 15 is at the OFF position, electric power fed into the wiper motor M1 from the positive-side power line L0 is maintained via the cam switch 14.

When wiper blade 7 is located at the home position, the movable contact 14d is separated from the a contact 14a and connected to the b contact 14b. As a result, both ends of the wiper motor M1 are joined to each other, forming a closed circuit, and are together grounded, so that the wiper motor M1 stops with the aid of dynamic braking.

(Rear Wiper Switch 15)

The rear wiper switch 15 is a switch for activating the wiper motor M1 and allows the driver to turn to the ON or OFF position. The rear wiper switch 15 has the +B terminal, S terminal and +1 terminal.

The +1 terminal is connected to the first terminal, or the positive terminal, of the wiper motor M1. The S terminal is connected to the common contact 14c of the cam switch 14. The +B terminal is connected to the motor harness L2, to the positive-side power line L0 via a fuse F2, and to the a contact 14a of the cam switch 14.

The rear wiper switch 15 is turned from the OFF position to the ON position when the driver wishes to activate the wiper motor M1, that is, to activate the rear wiper unit 6. Specifically, the wiper motor M1 is activated by flowing an electric current fed from the power line L0 through the +B and +1 terminals of the rear wiper switch 15 and the wiper motor M1 regardless of the state of the cam switch 14.

When the driver wishes to stop the wiper motor M1, or deactivate the rear wiper unit 6, the driver turns the rear wiper switch 15 from the ON position to the OFF position. Consequently, power is fed into the wiper motor M1 owing to the action of the cam switch 14. More specifically, when the wiper blade 7 is at a position other than the home position, the power fed into the wiper motor M1 from the positive-side power line L0 is maintained via the cam switch 14 as mentioned above, and when the wiper blade 7 has moved to the home position, the power for the wiper motor M1 is interrupted and, thus, the wiper motor M1 stops operating.

(Pump Motor M2)

The pump motor M2 causes the washer pump P to operate. The first terminal of the pump motor M2 is connected to the power line L0 via the fuse F2, whereas the second terminal of the pump motor M2 is grounded by way of a transistor Tr4. The wiper washer switch SW1 is connected to a base terminal of the transistor Tr4 through a resistor R4. When the wiper washer switch SW1 is manipulated, a washer signal W generated as a command signal therefrom is input into the base terminal of the transistor Tr4. Thus, when the H-level washer signal W is input into the base terminal of the transistor Tr4 as a result of manipulation of the washer switch SW1, the pump motor M2 becomes ready to operate and drive the washer pump P if the power is supplied through the power line L0. Consequently, the washer fluid is fed into the main pipe 8 from the tank T.

To summarize, the electric pump 20, which is configured with the pump motor M2 and the washer pump P, is caused to operate in accordance with the washer signal W fed from the wiper washer switch SW1 to thereby supply the washer fluid into the main pipe 8.

(Solenoid Changeover Valve 12)

The solenoid changeover valve 12 has an inlet port 12*a* for introducing the washer fluid from the main pipe 8 located upstream of the solenoid changeover valve 12. The solenoid changeover valve 12 further has a first outlet port 12*b* for discharging the washer fluid into the first branch pipe 8*b* and a second outlet port 12*c* for discharging the washer fluid into the second branch pipe 8*c*. The first branch pipe 8*b* is connected to the rear washer nozzle N1 located downstream of the solenoid changeover valve 12. The second branch pipe 8*c* is connected to the camera washer nozzle N2 located downstream of the solenoid changeover valve 12.

The solenoid changeover valve 12 connects the inlet port 12*a* to one of the first outlet port 12*b* and the second outlet port 12*c* and disconnects the inlet port 12*a* from the other by operating a valve SB provided in a valve main body of the solenoid changeover valve 12.

The valve SB is controlled by the excitation coil Bb provided in the solenoid changeover valve 12.

When the excitation coil Bb is not energized, or in an initial stage, the valve SB connects the inlet port 12*a* to the first outlet port 12*b* so that the inlet port 12*a* is held in a state disconnected from the second outlet port 12*c*. When the excitation coil Bb is energized, or during a period when the excitation coil Bb is in an energized state, on the other hand, the valve SB is actuated to connect the inlet port 12*a* to the second outlet port 12*c* so that the inlet port 12*a* is held in a state disconnected from the first outlet port 12*b*.

As a high-potential terminal of the excitation coil Bb of the solenoid changeover valve 12 is connected to the motor harness L2 for the cam switch 14 of the wiper motor M1, which is a power supply line routed to the wiper motor M1 at the rear of the vehicle 1, the high-potential terminal is connected to the positive-side power line L0 via the fuse F2. The ground-side terminal of the excitation coil Bb of the solenoid changeover valve 12 is connected to the voltage reduction controlling section 32 as shown in the above discussion. This means that while the reverse state signal L is input into the voltage reduction controlling section 32, the transistor Tr2 is kept on and the ground-side terminal of the excitation coil Bb is grounded via the voltage-dividing resistor R1. When the reverse state signal L is input into the voltage reduction controlling section 32, the transistor Tr3 is kept on only for the first time period T1 as depicted in FIG. 5 and the ground-side terminal of the excitation coil Bb is grounded through the transistor Tr3. Thus, an electric current flows without passing through the voltage-dividing resistor R1 until the first time period T1 elapses, so that a high-level switching voltage V1 is applied to the excitation coil Bb (refer to applied voltages in FIG. 5 for the switching voltage V1). As a result, an electromagnetic force that is sufficiently large to activate the valve SB for switching the washer fluid flow channel is produced and this electromagnetic force is applied to the valve SB, thereby creating a situation where the inlet port 12*a* is connected to the second outlet port 12*c*. The first time period T1 is preset to a sufficiently long duration of time during which the solenoid changeover valve 12 can finish changeover action (flow channel switching operation). During the period when the reverse state signal L continues to be input after the first time period T1 has elapsed, the transistor Tr3 is turned off, whereby an electric current flows through the voltage-dividing resistor R1 and a lower-level switched state retaining voltage V2 is applied to the excitation coil Bb (refer to applied voltages in FIG. 5 for the switched state retaining voltage V2). As a result, an electromagnetic force for retaining the valve SB is produced and applied thereto, so that the valve SB is held in position, thereby creating a situation where the inlet port 12*a* is connected to the second outlet port 12*c*.

Operation of the vehicular washing device of the foregoing second embodiment will now be described in the following.

When the reverse state signal L is set at the H level, that is, when the shift lever 3 is at the reverse direction, as depicted in FIG. 5, for example, the timer signal TK is brought up to the H level for the first time period T1 and the transistor Tr3 is turned on and remains conducted during the same time period, so that the switching voltage V1 raised to the H level is applied to the solenoid changeover valve 12. Consequently, the excitation coil Bb of the solenoid changeover valve 12 is energized and the inlet port 12*a* (main pipe 8) is connected to the second outlet port 12*c* (second branch pipe 8*c*). In this case, the washer fluid flow channel, which runs from the electric pump 20, is switched to the camera washer nozzle N2.

While the reverse state signal L is set at the H level, that is, while the shift lever 3 is at the reverse direction, the transistor Tr2 is turned on and remains conducted. During a period when the reverse state signal L is kept at the H level after the first time period T1 has elapsed, transistor Tr3 is kept off, so that a lower-level switched state retaining voltage V2 is applied to the solenoid changeover valve 12. Consequently, the common pipe 8*a* connected to the inlet port 12*a* is held in a state connected to the second branch pipe 8*c*, which is connected to the inlet port 12*a*. This means that the washer fluid flow channel that runs from the electric pump 20 remains switched to the camera washer nozzle N2.

If the washer signal W is turned to the H level, or the wiper washer switch SW1 is turned on, in this state, the electric pump 20 is activated so that the washer fluid is ejected from the camera washer nozzle N2 onto the glass window 10a of the onboard camera 10 (refer to camera washer ejection in FIG. 5) to thereby remove mud, dust, dirt, or the like adhering to the glass window 10a.

When the reverse state signal L is set at the L level, that is, when the shift lever 3 is at a position other than the reverse direction, the transistor Tr2 is turned off and the excitation coil Bb of the solenoid changeover valve 12 is brought to a de-energized state. Thus, the common pipe 8a connected to the inlet port 12a is disconnected from the second branch pipe 8c, which is connected to the second outlet port 12c, and the inlet port 12a is connected to the first outlet port 12b. This means that the washer fluid flow channel that runs from the electric pump 20 is switched again to the rear washer nozzle N1.

If the washer signal W is turned to the H level, or the wiper washer switch SW1 is turned on, in this state, the electric pump 20 is activated so that the washer fluid is ejected from the rear washer nozzle N1 onto the rear window 4 (refer to wiper washer ejection in FIG. 5).

Characteristic advantages of the second embodiment thus far described can be summarized as follows.

(6) While the reverse state signal L indicating that the vehicle 1 is currently in reverse is output, a voltage is applied to the solenoid changeover valve 12 and the washer fluid flow channel that runs from the electric pump 20 is switched from the rear washer nozzle N1 to the camera washer nozzle N2. It is therefore possible in the second embodiment to wash the rear window 4 and the glass window 10a of the onboard camera 10 by commonly using the electric pump 20 (the washer pump P and the pump motor M2) and the tank T, for example. An advantage that results from this approach of the second embodiment is that the vehicular washing device requires a small installation space and can be made inexpensive.

When the reverse state signal L is input, the switching voltage V1 is applied to the solenoid changeover valve 12 for the predetermined first time period T1. During a period when the reverse state signal L continues to be input after the first time period T1 has elapsed, the switched state retaining voltage V2 is applied instead of the switching voltage V1, the switched state retaining voltage V2 being lower than the switching voltage V1. It is therefore possible in the second embodiment to reduce unwanted power consumption. To be more specific, the solenoid changeover valve 12 requires the high switching voltage V1 only when switching the flow channel and can maintain state of the flow channel with the lower switched state retaining voltage V2 after switching the flow channel. Thus, compared to a comparative example in which the high switching voltage V1 continued to be applied even after the switching of the flow channel, the second embodiment can achieve a reduction in power consumption. As compared to the comparative example in which the high switching voltage V1 continued to be applied even after the switching of the flow channel, the second embodiment can reduce heat generation from the solenoid changeover valve 12 (excitation coil Bb). As a result, the second embodiment can achieve a size reduction and cost reduction of the solenoid changeover valve 12 to be employed, for example.

(7) As mentioned in the foregoing, the valve controlling section for applying one of the switching voltage V1 and the switched state retaining voltage V2 to the solenoid changeover valve 12 is the voltage reduction controlling section 32, which applies the switched state retaining voltage V2 obtained by lowering the initially applied switching voltage V1 to the solenoid changeover valve 12. This configuration makes it possible to integrate an arrangement for power supply wiring from a power source (e.g., a battery) to the solenoid changeover valve 12 into a single system. Thus, compared to a comparative example in which different power supply wiring systems for applying the switching voltage and switched state retaining voltage to the solenoid changeover valve 12 independently of each other are connected in parallel, the second embodiment makes it possible to shorten the length of the power supply wiring system employed.

(8) In the above-described voltage reduction controlling section 32, the transistor Tr2 is kept on while the reverse state signal L is being input, and the ground-side terminal of the solenoid changeover valve 12 is connected to the ground via the voltage-dividing resistor R1. When the reverse state signal L is input, the timer TM outputs the timer signal TK for turning on the transistor Tr3 and keeping the same on only for the first time period T1, so that the ground-side terminal of the solenoid changeover valve 12 is connected to the ground via the transistor Tr3. Thus, an electric current flows without passing through the voltage-dividing resistor R1 until the first time period T1 elapses, so that a high-level switching voltage V1 is applied to the solenoid changeover valve 12. During the period when the reverse state signal L continues to be input after the first time period T1 has elapsed, the transistor Tr3 is turned off, whereby an electric current flows through the voltage-dividing resistor R1 and a lower-level switched state retaining voltage V2 is applied to the solenoid changeover valve 12. According to this configuration, the ground-side terminal of the solenoid changeover valve 12 is already connected to the ground via the voltage-dividing resistor R1 before the transistor Tr3 is turned off. It is therefore possible to prevent the occurrence of a situation where no voltage is applied to the solenoid changeover valve 12 for an instant when the applied voltage is switched from the switching voltage V1 to the switched state retaining voltage V2, making it possible to ensure satisfactory switching conditions. In a comparative example of a circuit configuration in which the ground-side terminal of the solenoid changeover valve 12 is connected to the ground via the voltage-dividing resistor R1 when the transistor Tr3 is turned off, there is a possibility that no voltage is applied to the solenoid changeover valve 12 for an instant when the applied voltage is switched from the switching voltage V1 to the switched state retaining voltage V2. Although there is a risk that satisfactory switching conditions may not be ensured if such a situation occurs, the second embodiment makes it possible to prevent the occurrence of such a situation.

(9) The backup lamp BL is installed at the rear of the vehicle 1 and is lit when the shift lever 3 is moved to the reverse position. As part of the power supplied to the backup lamp BL is used as the reverse state signal L, the signal line from the shift lever 3 to the voltage reduction controlling section 32 located in the rear part of the vehicle 1 can be significantly shortened as compared to a case where a dedicated signal line is provided parallel to the lamp harness L1 routed to the backup lamp BL (comparative example).

The above-described second embodiment may be modified as follows.

The second embodiment employs a circuit configuration that allows the solenoid changeover valve 12 to perform flow channel switching operation when the electric pump 20 is activated. The second embodiment may however be modified to employ a circuit configuration including a pump controlling section that performs the flow channel switching operation by the solenoid changeover valve 12 under conditions where the electric pump 20 is deactivated. As an example, the pump controlling section may be a circuit that inhibits activation of the electric pump 20 during the first time period T1 regardless of the washer signal W, that is, regardless of whether the wiper washer switch SW1 is turned on.

Since the solenoid changeover valve 12 performs the flow channel switching operation under conditions where the electric pump 20 is deactivated in this configuration, the pressure in the piping is sufficiently low. This means that the solenoid changeover valve 12 can quickly perform the flow channel switching operation under conditions of a small resisting load. It is therefore possible to suppress power consumption needed for operating the solenoid changeover valve 12 and achieve a satisfactory switching response, for example. Since the electric pump 20 is not activated during execution of the flow channel switching operation by the solenoid changeover valve 12, it is possible to prevent inadvertent ejection of the washer fluid onto the rear window 4 or leakage of the washer fluid, for example.

According to the above-described second embodiment, the valve controlling section for applying one of the switching voltage V1 and the switched state retaining voltage V2 to the solenoid changeover valve 12 is the voltage reduction controlling section 32, which applies the switched state retaining voltage V2 obtained by lowering the initially applied switching voltage V1. The embodiment is not limited to this. The valve controlling section may apply one of the switching voltage V1 and the switched state retaining voltage V2 to the solenoid changeover valve 12 by a method differing from what has been described in the foregoing. For example, the valve controlling section may be configured such that different power supply wiring systems for applying the switching voltage and switched state retaining voltage to the solenoid changeover valve 12 independently of each other are connected in parallel.

In the above-described second embodiment, the reverse state signal L is part of the power supplied to the backup lamp BL, which is lit when the shift lever 3 is moved to the reverse position. The backup lamp BL is installed at the rear of the vehicle 1. The embodiment is not limited to this. The reverse state signal may be a current that flows in one of other systems. For example, the reverse state signal may be a signal detected when the vehicle 1 is actually reversing, that is, when the tires are turned to reverse direction. Furthermore, in a case where the vehicle 1 is configured to include a warning buzzer that sounds an alarm for alerting that the vehicle 1 is backing up, for example, part of an electric current supplied to the warning buzzer for generating the sound alarm when the shift lever 3 is placed at the reverse position may be used as the reverse state signal.

In the above-described second embodiment, the solenoid changeover valve 12 is connected to the motor harness L2, which is a power supply line routed to the wiper motor M1 at the rear of the vehicle 1. The embodiment is not limited to this. For example, the solenoid changeover valve 12 may be connected to a power supply line for feeding electric power to another piece of equipment installed at the rear of the vehicle 1 or to a power supply line routed at the front of the vehicle 1 independently of other pieces of equipment.

Figure 6:
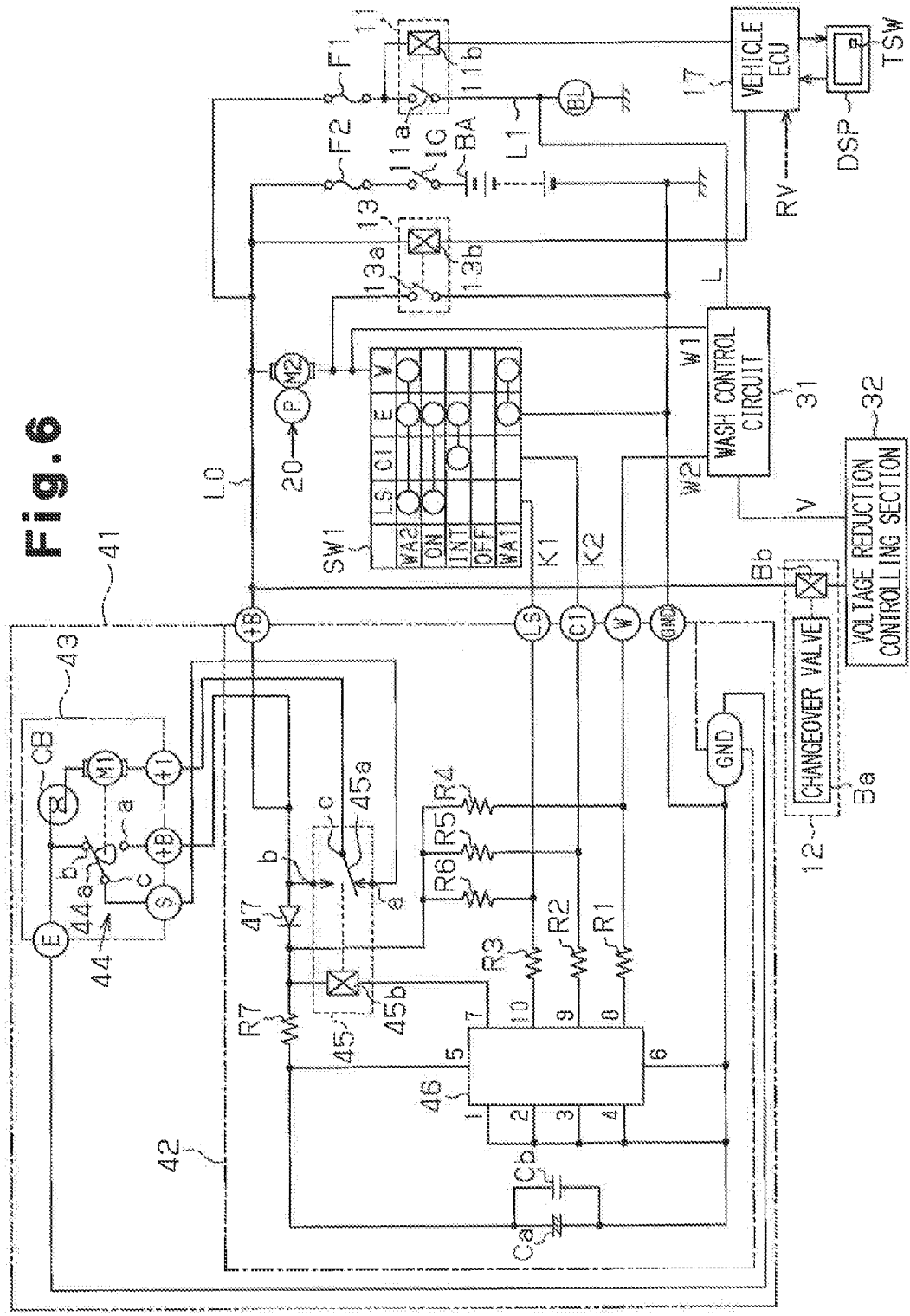
FIG. 6 is an electric circuit diagram used for explaining the electrical configuration of a vehicular washing device in a modification.

In the above-described second embodiment, the voltage reduction controlling section 32 is connected directly to the backup lamp BL. The embodiment of the disclosure is not limited to this. For example, the voltage reduction controlling section 32 may be arranged between the wash control circuit 31 of FIG. 2 and the solenoid changeover valve 12 as depicted in FIG. 6. Specifically, the voltage reduction controlling section 32 may be connected to the backup lamp BL by way of the wash control circuit 31. It is possible to reduce unwanted power consumption with this modified configuration as well.

Technical ideas obtainable from the above described second embodiment and modifications are listed below, together with advantages thereof.

The backup lamp installed at the rear of the vehicle is lit when the shift lever is placed at the reverse position. In the vehicular washing device, the reverse state signal is part of the power supplied to the backup lamp. This part of the power supplied to the backup lamp is input as the reverse state signal into the valve controlling section, which is located at the rear of the vehicle.

According to the above-described configuration, part of the power supplied to the backup lamp is used as the reverse state signal, wherein the backup lamp is lit when the shift lever is placed at the reverse position. It is therefore possible to significantly shorten the signal line from the shift lever to the valve controlling section at the rear of the vehicle as compared to a case where the signal line is provided parallel to the wiring routed to the backup lamp (comparative example).

(Third Embodiment)

Figure 7:
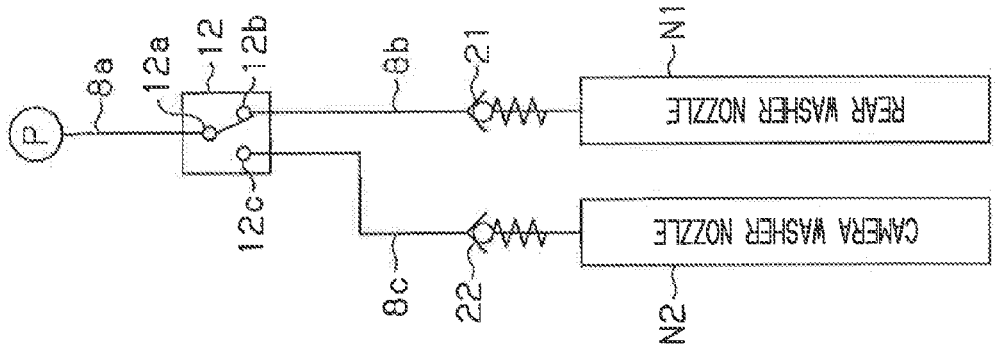
FIG. 7(*a*) is a schematic configuration diagram of a vehicle provided with a vehicular washing device according to a third embodiment.
Figure 7:
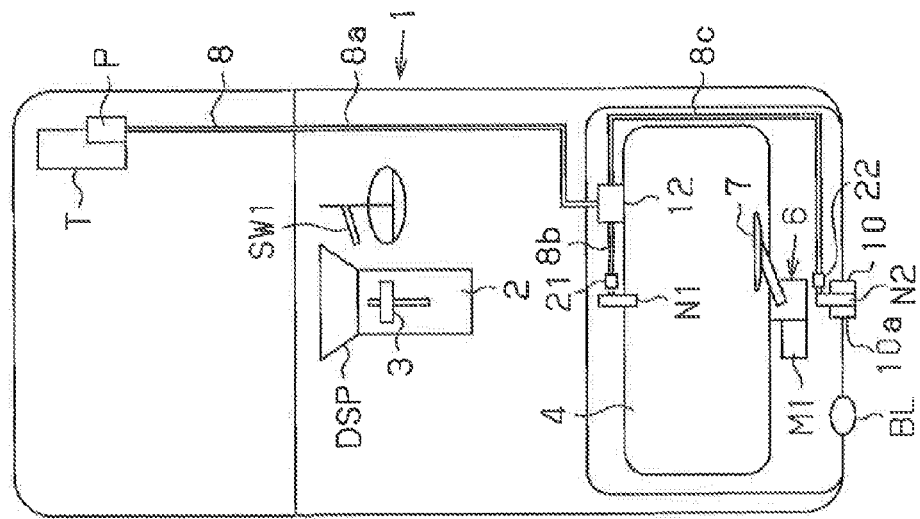
Figure 8:
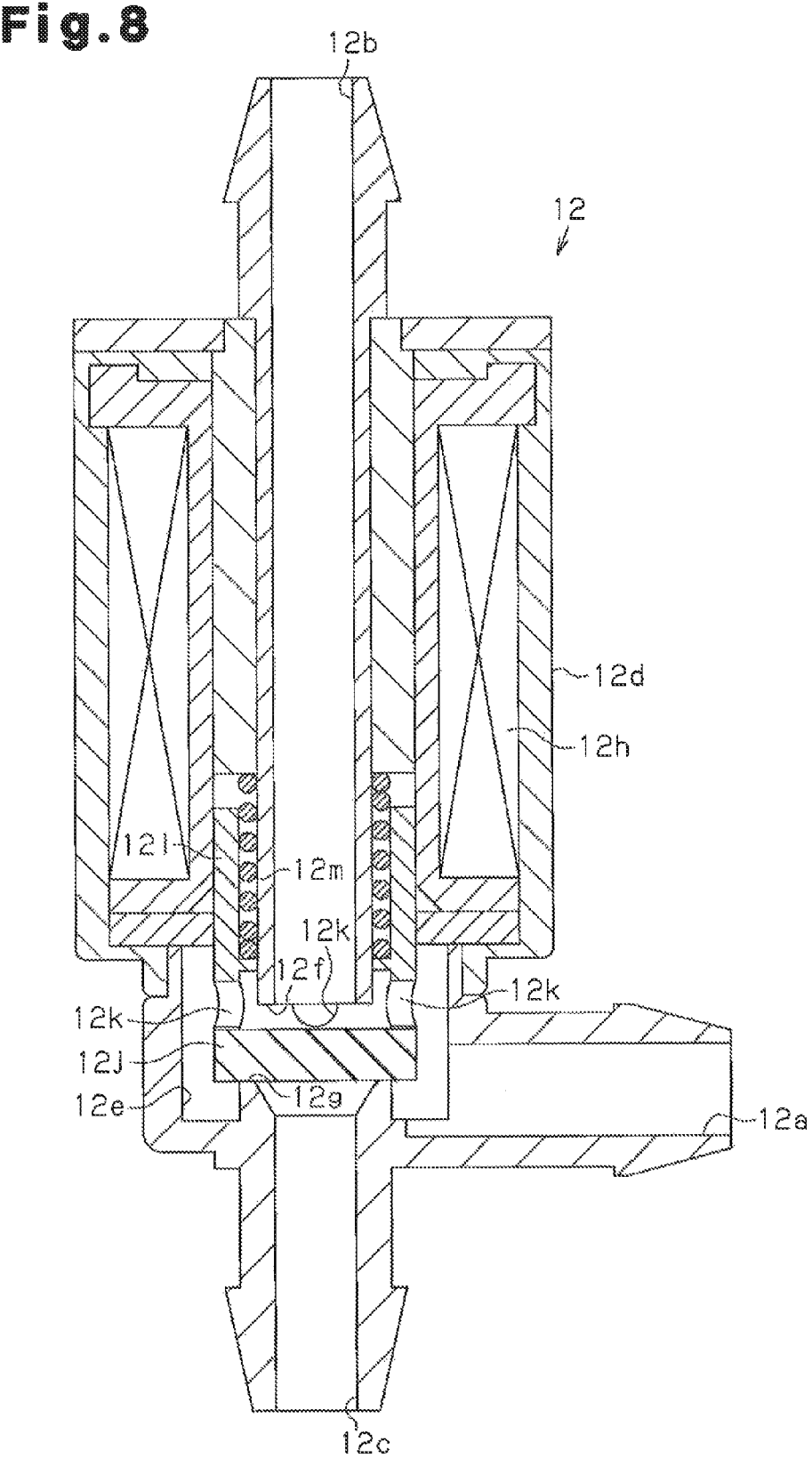
FIG. 8 is a cross-sectional diagram of a solenoid changeover valve of the third embodiment.

A vehicular washing device according to a third embodiment of this disclosure is described hereunder with reference to FIGS. 7(a), 7(b) and 8.

As depicted in FIG. 7(a), a vehicle 1 is provided with a shift lever 3 of a transmission 2. The shift lever 3 is located beside the driver's seat. As illustrated in FIG. 1, the transmission 2 alters the gear ratio of the vehicle 1.

A display DSP of a navigation system used for on-screen presentation of the vehicle's current position, a map and other information is installed in the console panel of the vehicle 1.

There is provided a rear wiper unit 6 at a rear central position of the vehicle 1 below a rear window 4, which is one of vehicle windows. The rear wiper unit 6 is provided with a wiper motor M1 and a wiper blade 7, which is driven by the wiper motor M1 to sweep across an outer surface of the rear window 4 in swing motion. The rear wiper unit 6 (wiper motor M1) of the third embodiment is interlocked with manipulation of a wiper washer switch SW1 (and with ejection of a washer fluid onto the rear window 4).

A rear washer nozzle N1 is provided just above the rear window 4 at the rear of the vehicle 1. The rear washer nozzle N1 serves as a window washing nozzle (first nozzle). A nozzle opening of the rear washer nozzle N1 is oriented downward toward the rear window 4 so that the washer fluid is directed from the nozzle opening onto the rear window 4, which is a first object to be washed.

An onboard camera 10 for monitoring a rear view is installed at a location further behind the rear wiper unit 6 at the rear of the vehicle 1 in the third embodiment. The onboard camera 10 used in the third embodiment is a rear view camera for visually monitoring the rear view. An image picked up by the onboard camera 10 is transmitted as image data to the display DSP provided in the console panel of the vehicle 1. The display DSP provides an on-screen presentation of the image captured by the onboard camera 10 on the basis of the incoming image data.

When the shift lever 3 of the transmission 2 is shifted to the backup position (reverse position), the onboard camera 10 begins to perform image pickup operation and transmits the image data captured to the display DSP. The onboard camera 10 terminates the image pickup operation when the shift lever 3 is shifted from the backup position (reverse position) to any of the other gear positions.

A camera washer nozzle N2 is provided at a location adjacent to the onboard camera 10 and outside a rearward imaging angle of view of the onboard camera 10. The camera washer nozzle N2 serves as a camera washing nozzle (second nozzle). A nozzle opening of the camera washer nozzle N2 is oriented toward a glass window 10a (refer to FIG. 1), which covers a lens of the onboard camera 10 to protect the same from mud, dust and dirt, for instance. The camera washer nozzle N2 ejects the washer fluid from the nozzle opening onto the glass window 10a of the onboard camera 10 as the second object to be washed.

A tank T and a washer pump P, which is an electric pump, are provided in the engine compartment at the front of the vehicle 1. The washer pump P, which has a pump motor, is activated as a result of manipulation of the wiper washer switch SW1 to feed the washer fluid stored in the tank T. A solenoid changeover valve 12 is connected to the washer pump P via a common pipe 8a. The solenoid changeover valve 12 serves as a changeover joint (switching joint). Further, the rear washer nozzle N1 is connected to the solenoid changeover valve 12 via a first branch pipe 8b, which serves as a main branch pipe. The camera washer nozzle N2 is connected to the solenoid changeover valve 12 via a second branch pipe 8c. The solenoid changeover valve 12 of the third embodiment is located at the rear of the vehicle 1.

As depicted in FIG. 8, the solenoid changeover valve 12 has an inlet port 12a, which serves as an inlet portion, a first outlet port 12b, which serves as a first outlet portion, and a second outlet port 12c, which serves as a second outlet portion. Then, as depicted in FIG. 7(a), the common pipe 8a (washer pump P) is connected to the inlet port 12a into which the washer fluid is introduced. The first branch pipe 8b (rear washer nozzle N1) is connected to the second outlet port 12c, and the second branch pipe 8c (camera washer nozzle N2) is connected to the second outlet port 12c. The solenoid changeover valve 12 connects the inlet port 12a to the second outlet port 12c when not activated (de-energized state) and connects the inlet port 12a to the second outlet port 12c when activated (energized state).

Specifically, the solenoid changeover valve 12 of the third embodiment is a solenoid changeover valve, which serves as a changeover joint. As illustrated in FIG. 8, a branch chamber 12e is formed within a case 12d, and on the inside of the branch chamber 12e, an inner opening 12f of the second outlet port 12c and an inner opening 12g of the second outlet port 12c are formed to face each other at a specific distance. An inner opening of the inlet port 12a is formed on one side of the branch chamber 12e. An excitation coil 12h is provided within the second outlet port 12c close to the second outlet port 12c (at an upper side as illustrated in FIG. 8). The excitation coil 12h is arranged to surround a flow channel of the second outlet port 12c. A pipe member 12i is provided on the inside of the excitation coil 12h and outside the flow channel of the second outlet port 12c. The pipe member 12i is made of a metal material and is arranged movably in the facing directions of the aforementioned inner openings 12f, 12g (up-down direction as illustrated in FIG. 8). A valve body 12j located between these two inner openings 12f, 12g is fixed to a first end (lower end as illustrated in FIG. 8) of the pipe member 12i. A plurality of connecting holes 12k are formed in the first end of the pipe member 12i in a circumferential direction thereof. The pipe member 12i is forced by a compression coil spring 12m, which serves as an urging member, so that the valve body 12j is pressed against the inner opening 12g of the second outlet port 12c so as to close the inner opening 12g in tight contact therewith.

More specifically, the solenoid changeover valve 12 presses the valve body 12j against the inner opening 12g of the second outlet port 12c in tight contact therewith with the aid of the urging force exerted by the compression coil spring 12m when the excitation coil 12h is not activated, or in the de-energized state. In this case, the solenoid changeover valve 12 closes off the inner opening 12g while connecting the inner opening 12f of the second outlet port 12c to the inlet port 12a via the connecting holes 12k. When the excitation coil 12h is activated in the energized state, the solenoid changeover valve 12 drives the valve body 12j upward together with the pipe member 12i as illustrated in FIG. 8, against the urging force of the compression coil spring 12m, so as to close off the inner opening 12f of the second outlet port 12c by pressing against the inner opening 12f in tight contact therewith while connecting the inner opening 12g of the second outlet port 12c to the inlet port 12a.

An electric circuit for the solenoid changeover valve 12 of the third embodiment is so configured as to excite and operate the excitation coil 12h as a result of manipulation of the shift lever 3 of the transmission 2 to the backup position (reverse position). This means that the solenoid changeover valve 12 connects the inner opening 12f of the second outlet port 12c to the inlet port 12a via the connecting holes 12k when the shift lever 3 of the transmission 2 is placed at a position other than the backup position (reverse position). When the shift lever 3 is placed at the backup position (reverse position), on the other hand, the solenoid changeover valve 12 connects the inner opening 12g of the second outlet port 12c to the inlet port 12a. The solenoid changeover valve 12 of the third embodiment employs a configuration discussed below, which permits an inflow of the washer fluid from the camera washer nozzle N2 even in the de-energized state (not activated).

As depicted in FIG. 7(b), there is provided a first check valve 21 in a fluid passage between the rear washer nozzle N1 and the second outlet port 12c of the solenoid changeover valve 12 at an end of the first branch pipe 8b connected to the rear washer nozzle N1. When the washer fluid fed from the solenoid changeover valve 12 reaches or exceeds a predetermined pressure, the first check valve 21 allows the washer fluid to pass through. There is also provided a second check valve 22 in a fluid passage between the camera washer nozzle N2 and the second outlet port 12c of the solenoid changeover valve 12 at an end of the second branch pipe 8c connected to the camera washer nozzle N2. When the washer fluid fed from the solenoid changeover valve 12 reaches or exceeds a predetermined pressure, the second check valve 22 allows the washer fluid to pass through.

The urging force of the compression coil spring 12m of the solenoid changeover valve 12 is so preset as to permit the inflow of the washer fluid the camera washer nozzle N2 (through the second outlet port 12c) at a pressure lower than the predetermined pressure for the second check valve 22. In other words, the urging force of the compression coil spring 12m of the solenoid changeover valve 12 and the urging force of a spring built in the second check valve 22 are individually preset in such a manner that the valve body 12j of the solenoid changeover valve 12 moves to permit the inflow of the washer fluid when the volume of the washer fluid left within a second branch pipe 8c between the solenoid changeover valve 12 and the second check valve 22 increased due to expansion. The solenoid changeover valve 12 is configured as described above as to permit the inflow of the washer fluid from the camera washer nozzle N2 (through the second outlet port 12c) even in the de-energized state (not activated).

Operation of the vehicular washing device configured as described above will now be discussed.

For example, when the shift lever 3 is placed at a position other than the backup position (reverse position), non-operating state of the solenoid changeover valve 12 is retained while the excitation coil 12h is not in the excited state and the solenoid changeover valve 12 is held in a state in which the inner opening 12f of the first outlet port 12b is connected to the inlet port 12a. If the wiper washer switch SW1 is manipulated in this state, the washer pump P is activated to feed the washer fluid from the washer pump P into the rear washer nozzle N1 through the solenoid changeover valve 12 (the first outlet port 12b) and the first check valve 21. Then, the washer fluid is ejected onto the rear window 4. At this time, a wiper blade 7 is driven by the rear wiper 6 (wiper motor M1) to sweep across an outer surface of the rear window 4 in swing motion, thereby washing the rear window 4.

For example, when the shift lever 3 is placed at the backup position (reverse position), the excitation coil 12h is excited and the solenoid changeover valve 12 is driven so that the inner opening 12g of the second outlet port 12c is connected to the inlet port 12a. If the wiper washer switch SW1 is manipulated in this state, the washer pump P is activated to feed the washer fluid from the washer pump P into the camera washer nozzle N2 through the solenoid changeover valve 12 (the second outlet port 12c) and the second check valve 22. Then, the washer fluid is ejected onto the glass window 10a of the onboard camera 10 and thereby the glass window 10a of the onboard camera 10 is washed.

Characteristic advantages of the third embodiment thus far described can be summarized as follows.

(10) If the washer pump P is operated when the solenoid changeover valve 12 is not operated, the washer fluid can be supplied to the rear washer nozzle N1 through the first outlet port 12b. If the washer pump P is operated when the solenoid changeover valve 12 is operated, the washer fluid can be supplied to the camera washer nozzle N2 through the second outlet port 12c. Therefore, the washer fluid can be selectively ejected to one of the rear window and the glass window 10a of the onboard camera 10 by a single tank T and the washer pump P.

The first check valve 21 is arranged between the rear washer nozzle N1 and the flow channel of the solenoid changeover valve 12. The second check valve 22 is arranged between the camera washer nozzle N2 and the flow channel of the solenoid changeover valve 12. The first check valve 21 and the second check valve 22 pass the washer fluid when the pressure of the washer fluid supplied from the solenoid changeover valve 12 becomes the predetermined pressure or more. Therefore, the washer fluid with a pressure corresponding to the predetermined pressure or less passing to the rear washer nozzle N1 and the camera washer nozzle N2 is prevented. Accordingly, in the acceleration, deceleration, and turning of the vehicle 1, unintentional leaks of the washer fluid from the rear washer nozzle N1 and a camera washer nozzle N2 are prevented.

Furthermore, even when the solenoid changeover valve 12 is not operated, that is, the inlet port 12a is connected to the first outlet port 12b, the flow in of the washer fluid from the camera washer nozzle N2 is allowed. Therefore, even if the volume of the washer fluid left in the second branch pipe 8c between the solenoid changeover valve 12 and the second check valve 22 expands due to being heated by sunlight and heat generated by the vehicle engine, the washer fluid can be returned to the tank T via the solenoid changeover valve 12. That is, as comparison, in the configuration of completely cutting off the flow of the washer fluid from the camera washer nozzle N2 when the solenoid changeover valve 12 is not in operation, there is a risk of the pressure reaching the predetermined pressure and the washer fluid leaking from the camera washer nozzle N2 if the washer fluid left in the second branch pipe 8c between the solenoid changeover valve 12 and the second check valve 22 expand due to being heated. However, the third embodiment prevents this from happening.

(11) When the solenoid changeover valve 12 is not operating, the solenoid changeover valve 12 closes the inner opening 12g by pressing the valve body 12j against the inner opening 12g of the second outlet port 12c by the energizing force of the compression coil springs 12m, and connects the inner opening 12f of the first outlet port 12b to the inlet port 12a. However, the solenoid changeover valve 12 allows the flow in of the washer fluid from the camera washer nozzle N2 with a pressure smaller than the predetermined pressure of the second check valve. As a result of this, the advantages described in the above (10) can be obtained with a simple structure by setting the compression coil springs 12m.

(12) In the configuration in which the tank T and the washer pump P are located in the front of the vehicle 1 and the rear washer nozzle N1 and the camera washer nozzle N2 are located in the rear of the vehicle 1, the solenoid changeover valve 12 is located in the rear of the vehicle 1. Accordingly, as a comparative example, the total length of all pipes, which are the common pipe 8a, the first branch pipe 8b and the second branch pipe 8c, can be shortened as compared to when the solenoid changeover valve 12 is located in the front of the vehicle 1. Thus, in the third embodiment, the material cost and the cost for routing pipes can be kept down.

(13) The first nozzle is a window washing nozzle (rear washer nozzle N1) for spraying washer fluid on the vehicle window (rear window 4). The second nozzle is a camera washing nozzle (camera washer nozzle N2) for spraying the washer fluid on the glass window 10a of the onboard camera 10. The state in which the washer pump P and the window washing nozzle (rear washer nozzle N1) are in communication with each other is normally maintained unless the solenoid changeover valve 12 is driven. Thus, for example, the washing fluid can be sprayed on the vehicle window (rear window 4) faster than when the washing fluid is sprayed on the glass window 10a of the onboard camera 10. Also, for example, the washing fluid can be sprayed on the vehicle window (rear window 4) if the switching of the solenoid changeover valve 12 cannot be performed (in the case of failure) while the solenoid changeover valve 12 is not driven.

The washing of the vehicle window (rear window 4) is completed by spraying the washing fluid and wiping it with the wiper blade 7. Therefore, it is desired to spray the washing fluid as soon as possible. The washing of the glass window 10a of the onboard camera 10 is performed such that the shift lever 3 is operated to the backup position (reverse position) before it is determined that the glass window should be washed when checking the image picked up by the onboard camera 10 displayed on the display DSP, the wiper washer switch SW1 is operated and the washing fluid is sprayed. Therefore, in the configuration like the third embodiment, in which the solenoid changeover valve 12 is driven when the shift lever 3 is operated to the backup position (reverse position), it is switched to a state in which the washer pump P and the camera washing nozzle (camera washer nozzle N2) are in communication before the wiper washer switch SW1 is operated. Accordingly, when the wiper washer switch SW1 is operated, the spraying of the washing fluid on the glass window 10a of the onboard camera 10 will not be significantly delayed. The configuration of the third embodiment is advantageous, in that the state in which the washer pump P and the camera washing nozzle (camera washer nozzle N2) are in communication is maintained.

Furthermore, the first nozzle is the rear washer nozzle N1 for spraying the washing fluid on the rear window 4. Therefore, the rear washer nozzle N1 is excellent with the camera washing nozzle (camera washer nozzle N2) due to the difference of required washing fluids, and the washing fluid is sprayed well by a single washer pump P as compared to a comparative example in which the first nozzle is the front window washing nozzle. In detail, the amount of the washing fluid sprayed on the front window is generally more than the amount of the washing fluid sprayed on the rear window 4 while the amount of the washing fluid sprayed on the glass window 10a of the onboard camera 10 may be small. In the case where the first nozzle is a front window nozzle, the spraying amount (spraying rate) of the washer pump P increases accordingly, the washer pump P excessively provides the washing fluid to the camera washer nozzle N2. This may result in, for example, bubbling of the washing fluid sprayed by the camera washer nozzle N2. In contrast, in the case where the first nozzle is the rear washer nozzle N1, it is hard to excessively provide the washing fluid to the camera washer nozzle N2 even with the washer pump P so that the washing fluid sprayed by the camera washer nozzle N2 is less likely to be bubbling. Therefore, as compared to a comparative example in which the first nozzle is the front window washing nozzle, the washing fluid can be sprayed well on each part. In order to suppress the bubbling when the first nozzle is the front window washing nozzle, other components may be provided to reduce the flow rate of the washing fluid to the nozzle tip of the camera washer nozzle N2. In this case, however, the number of components and the costs will be increased.

The third embodiment may be modified as follows.

In the third embodiment, it is configured such that, by adjusting the setting of the compression coil spring 12m of the solenoid changeover valve 12, the washing fluid is allowed to flow (flow back) from the camera washer nozzle N2, that is, the second outlet port 12c to the solenoid changeover valve 12. However, this embodiment only needs to be provided with the similar function. Thus, for example, the configuration may be changed by providing a bypass flow channel allowing the washing fluid to flow (flow back) to the solenoid changeover valve 12.

In the third embodiment, the tank T and the washer pump P are located in the front of the vehicle 1, the rear washer nozzle N1 (the first nozzle), the camera washer nozzle N2 (the second nozzle) and the solenoid changeover valve 12 are located in the rear of the vehicle 1. In other examples, however, the tank T, the washer pump P, the first nozzle, the second nozzle and the solenoid changeover valve 12 may be located anywhere.

In the third embodiment, the first nozzle is the rear washer nozzle N1. For example, however, the first nozzle may be the front window washing nozzle for spraying the washing fluid on the front window. The second nozzle is the camera washer nozzle N2. For example, however, the second nozzle may be a front camera washer nozzle for spraying the washing fluid on the image capturing surface of the onboard camera for shooting the front of the vehicle or a side camera washing nozzle for spraying the washing fluid on the image capturing surface of the onboard camera for shooting the side of the vehicle. The first and second nozzles do not necessarily need to be nozzles for spraying the washing fluid on the image capturing surface of the window and the onboard camera. The first and second nozzles are, for example, other nozzles for spraying the washing fluid on a side mirror, head light and the like.

In the above third embodiment, the first check valve 21 is arranged in the flow channel between the solenoid changeover valve 12 and the rear washer nozzle N1. To be exact, however, the first check valve only needs to be arranged in the flow channel between the solenoid changeover valve 12 and the nozzle tip of the rear washer nozzle N1. In the embodiment, the first check valve 21 may be incorporated in the rear washer nozzle N1. Needless to say, the second check valve 22 may also be incorporated in the camera washer nozzle N2.

Technical ideas obtainable from the above described embodiment and modifications are listed below, together with advantages thereof.

In the vehicular washing device, the window washing nozzle is a rear window washing nozzle for spraying the washing fluid on the rear window as the first object to be washed, and the camera washing nozzle is a camera washer nozzle for spraying the washing fluid on the image capturing surface of the onboard camera for back-monitoring as the second object to be washed.

According to this configuration, unless the solenoid changeover valve is driven, the washer pump and the rear window washing nozzle are maintained to in communication. Thus, for example, the washing fluid can be sprayed on the rear window more quickly than when sprayed on the image capturing surface of the onboard camera for back-monitoring. For example, the washing fluid can be sprayed on the rear window if the switching of the solenoid changeover valve cannot be performed (in the case of failure) while the solenoid changeover valve is not driven.

(Fourth Embodiment)

A vehicular washing device according to a fourth embodiment of this disclosure will be described with reference to FIG. 9.

Figure 9:
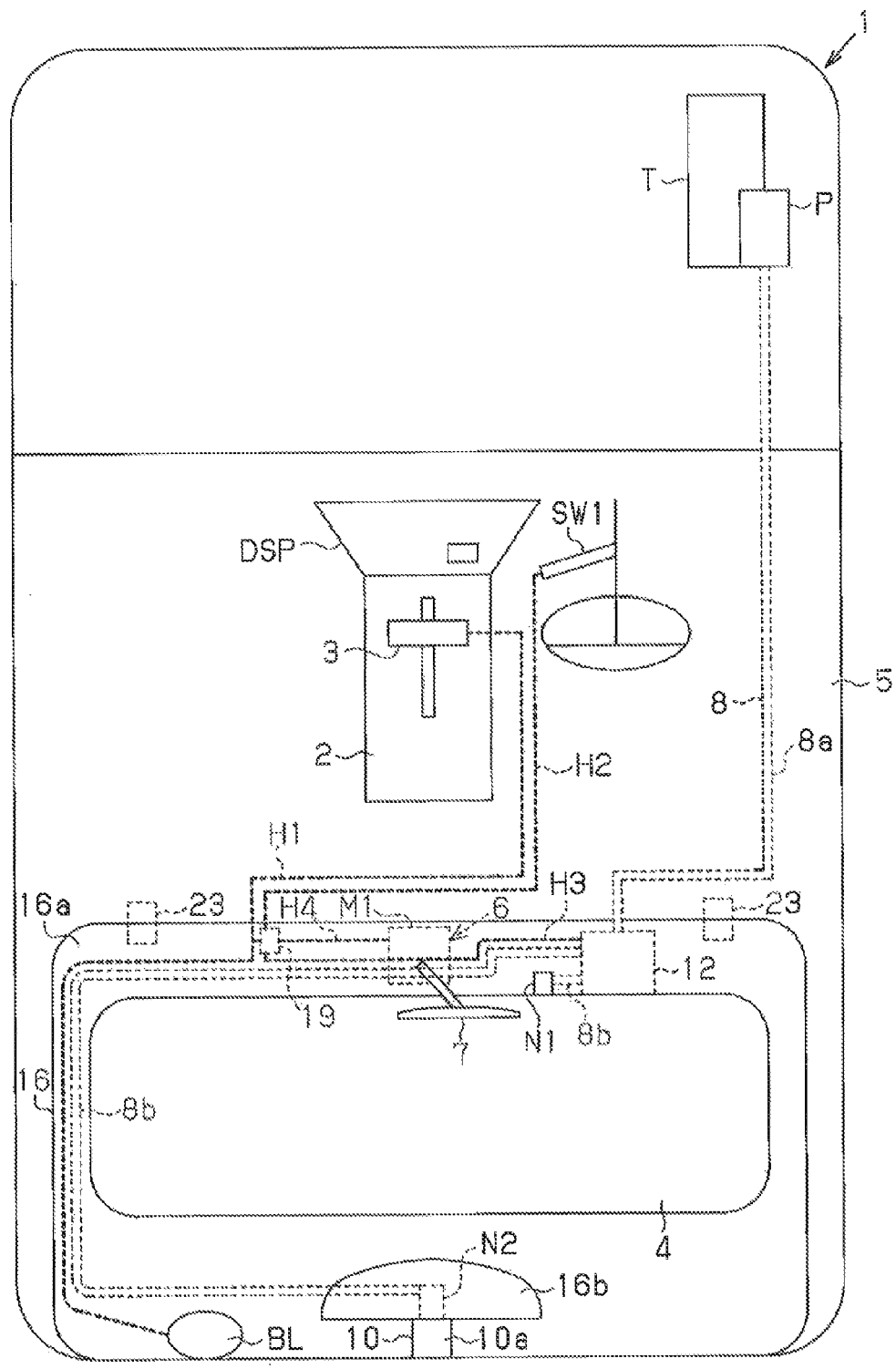
FIG. 9 is a schematic configuration diagram of a vehicle provided with a vehicular washing device according to a fourth embodiment.

As depicted in FIG. 9, a vehicle 1 is provided with a shift lever 3 of a transmission 2. The shift lever 3 is located beside the driver's seat. As illustrated in FIG. 1, the transmission 2 alters the gear ratio of the vehicle 1.

Further, when the shift lever 3 is shifted to the backup, or reverse, position, the transmission 2 puts the vehicle 1 in reverse, in which the driver can reverse the vehicle 1. While the shift lever 3 is held at the backup (reverse) position, a backup lamp BL provided at the rear of the vehicle 1 is lit. The backup lamp BL is provided at the back door 16 of the vehicle 1. More particularly, the back door 16 of the fourth embodiment is connected to a pair of hinges 23 at an upper end of the vehicle body 5. The hinge 23, which serve as a rotational joint portion, are rotatable and openable/closable to the vehicle body 5. On an upper part of the back door 16, a rear window 4 is provided and the backup lamp BL of the fourth embodiment is provided below the rear window 4. The backup lamp BL is connected to the shift lever 3 via a line H1. When the shift lever 3 is positioned at the backup position, power is supplied to the backup lamp BL so that the backup lamp BL is lit.

A display DSP of a navigation system used for on-screen presentation of the vehicle's current position, a map and other information is installed in the console panel of the vehicle 1.

There is provided a rear wiper unit 6 above the rear window 4 in the back door 16 of the vehicle 1. The rear wiper unit 6 is provided with a wiper motor M1 arranged between an outer panel 16a of the back door 16 and an inner panel (not shown). The rear wiper unit 6 is also provided with a wiper blade 7 fixed to an output shaft of the wiper motor M1 exposed from the outer panel 16a. When the wiper motor M1 is driven, the wiper blade 7 sweeps across the outer surface of the rear window 4.

There is provided a rear washer nozzle N1 above the rear window 4 in the back door 16 of the vehicle 1. A nozzle opening of the rear washer nozzle N1 is oriented downward toward the rear window 4, and the rear washer nozzle N1 ejects the washer fluid onto a surface of the rear window 4 to be swept.

The rear washer nozzle N1 is connected to a washer pump P provided in the engine compartment at the front of the vehicle 1 via a main pipe 8 (a common pipe 8a and a first branch pipe 8b). The washer pump P is a pump that supplies the washer fluid stored in a tank T, which is also provided in the engine compartment, to the rear washer nozzle N1 via the main pipe 8 (a common pipe 8a and a first branch pipe 8b). When a wiper washer switch SW1 provided at the driver's seat is operated, the washer pump P is driven to feed the washer fluid from the tank T to the rear washer nozzle N1 via the main pipe 8.

An onboard camera 10 for monitoring a rear view is installed below the rear window 4 in the back door 16 of the vehicle 1. The onboard camera 10 used in the fourth embodiment is a rear view camera for visually monitoring the rear view. An image picked up by the onboard camera 10 is output as image data to the display DSP installed in the console panel of the vehicle 1. The display DSP displays on the screen an image picked up by the onboard camera 10 based on the image data.

When the shift lever 3 of the transmission 2 is shifted to the backup position (reverse position), the onboard camera 10 begins to perform image pickup operation and outputs the image data captured to the display DSP. The onboard camera 10 terminates the image pickup operation when the shift lever 3 is shifted from the backup position (reverse position) to any of the other gear positions.

A camera washer nozzle N2 is provided above the onboard camera 10 in the back door 16 and between the outer panel 16a and a rear garnish 16b in the front-back direction of the vehicle. The camera washer nozzle N2 serves as a camera washing nozzle. A nozzle opening of the camera washer nozzle N2 is oriented toward a glass window 10a, which is provided to protect a lens of the onboard camera 10 from mud, dust and dirt, for instance. The camera washer nozzle N2 ejects the washer fluid from the nozzle opening onto the glass window 10a of the onboard camera 10.

The camera washer nozzle N2 is connected to a second branch pipe 8c which branches out from the main pipe 8 connecting the washer pump P and the rear washer nozzle N1. A solenoid changeover valve 12 is located at a branching point where the second branch pipe 8c branches out from the main pipe 8. The solenoid changeover valve 12 serves as a changeover device. The solenoid changeover valve 12 can selectively switch a flow channel of the washer fluid fed from the washer pump P to the camera washer nozzle N2 or to the rear washer nozzle N1. That is, the main pipe 8 includes a common pipe 8a connecting the washer pump P to the solenoid changeover valve 12 and a first branch pipe 8b connecting the solenoid changeover valve 12 to the rear washer nozzle N1. The solenoid changeover valve 12 selectively connects the common pipe 8a to the first branch pipe 8b or the second branch pipe 8c.

A control device 19 is provided above the rear window 4 in the back door 16 and between the outer panel 16a and an inner panel (not shown). The control device 19 switches the solenoid changeover valve 12 from the rear washer nozzle N1 to the camera washer nozzle N2. The control device 19 controllably drives the wiper motor M1 when the wiper washer switch SW1 has been operated.

Specifically, the control device 19 is connected to the line H1, which is connected to the backup lamp BL, and connected to the wiper washer switch SW1 via the line H2. The control device 19 is connected to the solenoid changeover valve 12 via the line H3 and connected to the wiper motor M1 via the wiring H4. The lines H1, H2 are connected to the control device 19 via the rotational joint portion, that is, from above the vehicle body 5 to above the back door 16. In the fourth embodiment, the line H1 is installed to a position of the backup lamp BL through left side of the rear window 4 when viewed from the rear of the vehicle. In the fourth embodiment, the line H1 is installed to a position of the washer nozzle N2 through left side of the rear window 4 when viewed from the rear of the vehicle, and arranged at a common arrangement space along the line H1 on the left side of the rear window 4.

The control device 19 supplies power to the solenoid changeover valve 12 via the line H3 and to the wiper motor M1 via the line H4 based on a signal from the line H1, H2, thereby controlling the solenoid changeover valve 12 or the wiper motor M1.

Operation of the fourth embodiment (a washing device for a vehicle) configured as described above will now be explained.

(When the Shift Lever 3 is Positioned at the Backup Position (Reverse Position))

When, for example, the shift lever 3 is at a position outside the backup position (reverse position), the backup lamp BL is off, and in this state, the control device 19 maintains the solenoid changeover valve 12 on the rear washer nozzle N1 side. When the washer pump P is driven based on the operation of the wiper washer switch SW1, the washer fluid is ejected from the rear washer nozzle N1 onto the rear window 4. When the wiper motor M1 is driven based on the operation of the wiper washer switch SW1, the wiper blade 7 sweep across an outer surface of the rear window 4.

(When the Shift Lever 3 is Positioned at the Backup Position (Reverse Position))

When, for example, the shift lever 3 is at the backup position (reverse position), the backup lamp BL is lit. In this state, the solenoid changeover valve 12 is switched from the rear washer nozzle N1 to the camera washer nozzle N2. When the washer pump P is driven based on the operation of the wiper washer switch SW1, the washer fluid is ejected from the camera washer nozzle N2 onto the glass window 10a of the onboard camera 10, but the wiper motor M1 cannot be activated in a state where the solenoid changeover valve 12 is switched to the camera washer nozzle N2. Even when the wiper washer switch SW1 is operated, it is impossible to sweeping across the rear window 4 by the wiper blade 7.

Characteristic advantages of the fourth embodiment will now be described.

(14) The rear washer nozzle N1, the camera washer nozzle N2, the solenoid changeover valve device 12, the backup lamp BL and the control device 19 are all arranged in the back door 16. Therefore, in comparison with the comparative example in which any one of these components is arranged in the vehicle body 5, the distance of the lines and pipes to be branched can be made shorter in the fourth embodiment. Therefore, the present embodiment makes it easier to place the lines (H1 to H3) and the pipes (such as main pipe 8 and second branch pipe 8c) and shorten the length of these materials.

(15) The wiper motor M1, which is controlled by the control device 19, is also arranged in the back door 16. Therefore, the line H4 to connect the control device 19 to the wire motor M1 is made shorter.

(16) The control device 19 inhibits the wiper motor M1 from being driven when the solenoid changeover valve 12 is switched to the camera washer nozzle N2. Therefore, the wiper motor M1 is not driven. As a result, the rear window 4 in a dry condition is prevented from being wiped by the wiper blade 7 when the glass window 10*a*, which is an image capturing surface of the onboard camera 10, is washed by spraying washing liquid thereon.

(17) The second branch pipe 8*c* is partially arranged along the line H1 connected to the back lamp BL (on the left side of the rear window 4 in the back door 16 as viewed from the rear side of the vehicle). Therefore, a space to arrange the line H1 and a space to arrange the second branch pipe 8*c* can be shared in an area along the line H1. It is therefore made easier to arrange the line H1 and the second branch pipe 8*c* in the arrangement space. For example, it is much easier to arrange the line H1 connected to the back lamp BL and the second branch pipe 8*c* in the arrangement space by binding them to support each other.

(18) The control device 19 is arranged in a position between the rotational joint portion with the vehicle body 5 in the back door 16 (i.e., hinge 23) and the rear window 4 so that the distance from the rotational joint portion to the control device 19 becomes shorter. Accordingly, the impact applied to the control device 19 in opening/closing the back door 16 is reduced. Since the wiper motor M1 and the solenoid changeover valve 12 are also arranged in a position between the rotational joint portion (i.e. hinge 23) and the rear window 4, the impact applied in opening/closing the back door 16 is similarly reduced.

(19) The camera washer nozzle N2 is arranged in a space between the outer panel 16*a* and the rear garnish 16*b* in the front-back direction of the vehicle while the solenoid changeover valve 12 and the control device 19 are arranged in a space between the outer panel 16*a* and an inner panel (not shown). Thus, the camera washer nozzle N2, the solenoid changeover valve 12 and the control device 19 are arranged to be concealed from the rear side of the vehicle. Therefore, the appearance of the vehicle is not degraded by these components.

The fourth embodiment may also be modified as follows.

The wiper motor M1, which is controlled by the control device 19, is also arranged in the back door 16 in the fourth embodiment. However, the present embodiment is not limited to this configuration and may be modified to provide, for example, a washing device for vehicle in a configuration without having the wiper motor M1 (or the rear wiper unit 6). In this case also, the control device 19 may be a control device that does not make a control to inhibit the wiper motor M1 from being driven when the solenoid changeover valve 12 is switched to the camera washer nozzle N2.

The second branch pipe 8*c* is partially arranged along the line H1 connected to the back lamp BL in the fourth embodiment. However, the present embodiment is not limited to this configuration and may also be configured such that, for example, the second branch pipe 8*c* is installed by being passed through the right side of the rear window 4 as viewed from the rear side of the vehicle so as to reach the camera washer nozzle N2.

The control device 19 is arranged in a position between the rotational joint portion with the vehicle body 5 in the back door 16 (i.e. hinge 23) and the rear window 4 in the fourth embodiment. However, the present embodiment is not limited to this configuration. For example, the control device 19 may be arranged in any other positions in the back door 16. The wiper motor M1 (or the rear wiper unit 6) and the solenoid changeover valve 12 or other components may also be arranged in other positions. For example, the wiper motor M1 may be arranged below the rear window 4 in the back door 16.

In the fourth embodiment, the control device 19 has been electrically connected to wiper motor M1 (rear wiper motor) through the wire H4, and the control device 19 is provided separately from the wiper motor M1. Not limited to this embodiment, the control device 19, which is electrically connected to the wiper motor M1 may be accommodated and fixed in the wiper motor M1. That is, the control device 19 may be accommodated in the housing of the wiper motor M1. In this case, number of manufacturing processes are reduced because it is no longer necessary to provide the wire H4 to electrically connect the control device 19 with the wiper motor M1. Further, by the control device 19 being accommodated in the wiper motor M1, a case for ensuring waterproofness and dust-proofness of the control device 19 is no longer necessary, and the number of components is reduced.

The fourth embodiment relates to the vehicle 1, in which the rotational joint portion (i.e. hinge 23) is present in an upper area of the back door 16. However, the present embodiment is not limited to this configuration and may also be applied to a vehicle in which the rotational joint portion (i.e. hinge 23) is embodied by being arranged on the side of the back door 16 (end portion in the width direction of the vehicle). Even in this case, impact applied in opening/closing the back door 16 can be reduced by arranging the control device 19 and the solenoid changeover valve 12 or other components in a position between the rotational joint portion with the vehicle body 5 (i.e. end portion in the width direction of the vehicle) and the rear window 4 in the back door 16.

The camera washer nozzle N2, the solenoid changeover valve 12 and the control device 19 are concealed from the rear side of the vehicle in the fourth embodiment. However, the present embodiment is not limited to this configuration and these components may be arranged to be visible from the rear side of the vehicle. For example, it may be configured such that any one or two of the camera washer nozzle N2, the solenoid changeover valve 12 and the control device 19 is concealed from the rear side of the vehicle. Even in this case, the appearance of the vehicle is not degraded by these concealed components.

The fourth embodiment is configured to arrange the back lamp BL only in the back door 16. However, the present embodiment is not limited to this configuration and may also be configured with, for example, additional arrangement of a back lamp with a design property continuously to the back lamp BL in the vehicle body 5.

Technical ideas obtainable from the above described embodiment and modifications are listed below, together with advantages thereof.

In the washing device for vehicle, the control device inhibits driving the wiper motor when the changeover device is switched to the camera washer nozzle.

According to this configuration, the wiper motor is not driven when the changeover device is switched to the camera washer nozzle. Therefore, the rear window in a dry condition is prevented from being wiped by the rear wiper when the image capturing surface of the onboard camera is washed by spraying washing liquid onto the image capturing surface of the onboard camera.

The invention claimed is:

1. A washing device for a vehicle comprising:
   a camera washing nozzle for spraying washer fluid onto an image capturing surface of an onboard camera arranged outside the vehicle;
   a window washing nozzle for spraying washer fluid onto a vehicle window;
   an electric pump for feeding the washer fluid stored in a tank;

a branch pipe branched from a main pipe, which connects the electric pump and the window washing nozzle, wherein the branch pipe connects the main pipe and the camera washing nozzle;

a changeover valve device provided in a branched portion of the main pipe and the branch pipe, wherein the changeover valve is capable of selectively switching the flow path of the washer fluid from the electric pump to the window washing nozzle or to the camera washing nozzle;

a wiper motor for actuating a wiper that wipes the window of the vehicle;

a wiper washer switch capable of performing an interlocking operation for actuating the electric pump and the wiper motor together; and a wash control circuit, wherein, when receiving no reverse state signal, which indicates that the vehicle is in reverse, the wash control circuit holds the changeover valve device on the side of the window washing nozzle and allows actuation of the wiper motor by the interlocking operation, and wherein, based on input of a reverse state signal, the wash control circuit switches the changeover valve device from the window washing nozzle to the camera washing nozzle and inhibits the actuation of the wiper motor by the interlocking operation;

a valve controlling section, wherein the valve controlling section applies a switching voltage to the changeover valve device for a predetermined first time period based on input of the reverse state signal, and after the first time period and during a period in which the valve controlling section continues to receive the reverse state signal, the valve controlling section applies a switched state retaining voltage, which is lower than the switching voltage, instead of the switching voltage.

2. The washing device for a vehicle according to claim 1, wherein the valve controlling section is a voltage reduction controlling section, which applies the switched state retaining voltage to the changeover valve device by reducing the switching voltage.

3. The washing device for a vehicle according to claim 2, wherein the voltage reduction controlling section includes:
   a voltage-dividing resistor connected to a grounc -side terminal of the changeover valve device;
   a first switching element connected in between the voltage-dividing resistor and the ground, the first switching element being turned on while the reverse state signal is input;
   a second switching element connected in between the ground-side terminal of the changeover valve device and the ground; and
   a timer, wherein when receiving the reverse state signal, the timer outputs a timer signal to turn on the second switching element for the first time period.

4. The washing device for a vehicle according to claim 1, further comprising:
   a touch panel controlling section, which displays, on a display provided in the vehicle, an image captured by the onboard camera and a touch panel switch for washing the camera, during the reverse state, and actuates the electric pump based on the operation of the touch panel switch for washing of the camera.

5. The washing device for a vehicle according to claim 1, wherein the reverse state signal, which indicates that the vehicle is in reverse, is an electrical signal of the reverse position out of the positions of the shift lever, which is part of the transmission of the vehicle.

6. The washing device for a vehicle according to claim 5, wherein
   the reverse state signal is a power supply to a backup lamp provided in a rear part of the vehicle,
   the backup lamp is lit when the shift lever is in the reverse position,
   the wash control circuit is arranged in the rear part of the vehicle, and
   part of the power supply to the backup lamp is input as the reverse state signal.

7. A washing device for a vehicle comprising;
   a camera washing nozzle for spraying washer fluid onto an image capturing surface of an onboard camera arranged outside the vehicle;
   a window washing nozzle for spraying washer fluid onto a vehicle window;
   an electric pump for feeding the washer fluid stored in a tank;
   a branch e branched from a main he, which connects the electric pump and the window washing nozzle, wherein the branch pipe connects the main pipe and the camera washing nozzle;
   a changeover valve device provided in a branched portion of the main pipe and the branch pipe, wherein the changeover valve is capable of selectively switching the flow path of the washer fluid from the electric pump to the window washing nozzle or to the camera washing nozzle;
   a wiper motor for actuating a wiper that wipes the window of the vehicle;
   a wiper washer switch of capable of performing an interlocking operation for actuating the electric pump and the wiper motor together, and
   a wash control circuit, wherein, when receiving no reverse state signal, which indicates that the vehicle is in reverse, the wash control circuit holds the changeover valve device on the side of the window washing nozzle and allows actuation of the wiser motor by the interlocking operation, and wherein, based on input of a reverse state signal, the wash control circuit switches the changeover valve device from the window washing nozzle to the camera washing nozzle and inhibits the actuation of the wiper motor by the interlocking operation;
   a pump controlling section comprising a circuit, the pump controlling section configured to inhibit activation of the electric pump and to cause the changeover valve device to perform a flow channel switching operation with the electric pump stopped.

8. The washing device for a vehicle according to claim 7, further comprising:
   a touch panel controlling section, which displays, on a display provided in the vehicle, an image captured by the onboard camera and a touch panel switch for washing the camera, during the reverse state, and actuates the electric pump based on the operation of the touch panel switch for washing of the camera.

9. The washing device for a vehicle according to claim 7, wherein the reverse state signal, which indicates that the vehicle is in reverse, is an electrical signal of the reverse position, the reverse position being one of multiple positions of the shift lever, the shift lever forming part of the transmission of the vehicle.

10. The washing device for a vehicle according to claim 9, wherein
    the reverse state signal is a power supply to a backup lamp provided in a rear part of the vehicle, the backup lamp is lit when the shift lever is in the reverse position, the wash control circuit is arranged in the rear part of the vehicle, and part of the power supply to the backup lamp is input as the reverse state signal.

11. A washing device for a vehicle comprising:

a camera washing nozzle for spraying washer fluid onto an image capturing surface of an onboard camera arranged outside the vehicle;

a window washing nozzle for spraying washer fluid onto a vehicle window;

an electric pump for feeding the washer fluid stored in a tank;

a branch pipe branched from a main pipe, which connects the electric pump and the window washing nozzle, wherein the branch pipe connects the main pipe and the camera washing nozzle;

a changeover valve device provided in a branched portion of the main pipe and the branch pipe, wherein the changeover valve is capable of selectively switching the flow path of the washer fluid from the electric pump to the window washing nozzle or to the camera washing nozzle;

a wiper motor for actuating a wiper that wipes the window of the vehicle;

a wiper washer switch capable of performing an interlocking operation for actuating the electric pump and the wiper motor together; and a wash control circuit, wherein, when receiving no reverse state signal, which indicates that the vehicle is in reverse, the wash control circuit holds the changeover valve device on the side of the window washing nozzle and allows actuation of the wiper motor by the interlocking operation, and wherein, based on input of a reverse state signal, the wash control circuit switches the changeover valve device from the window washing nozzle to the camera washing nozzle and inhibits the actuation of the wiper motor by the interlocking operation;

a first check valve provided in a channel between the camera washing nozzle and the changeover valve device; and a second check valve provided in a channel between the window washing nozzle and the changeover valve device, wherein the check valves allow the washer fluid to pass through when the pressure of the washer fluid fed from the changeover valve device is more than or equal to a predetermined pressure, and the changeover valve device allows an influx of washer fluid from the camera washing nozzle when receiving no reverse state signal.

12. The washing device for a vehicle according to claim 11, wherein the main pipe is formed by a common pipe connecting the electric pump and the changeover valve device to each other and a main branch pipe connecting the changeover valve device and the window washing nozzle to each other, the changeover valve device has an inlet portion connected to the common pipe, a first outlet portion connected to the main branch pipe, and a second outlet portion connected to the branch pipe, when receiving no reverse state signal, the changeover valve device presses a valve body with an urging force of an urging member to bring the valve body into contact with an inner opening of the second outlet portion, thereby closing the inner opening, and connects an inner opening of the first outlet portion to the inlet portion, when receiving the reverse state signal, the changeover valve device actuates and presses the valve body against the urging force of the urging member to bring the valve body into contact with the inner opening of the first outlet thereby closing the inner opening and connecting the inner opening of the second outlet portion to the inlet portion, and the urging three of the urging member is set such that the urging member allows the influx of washer fluid from the camera washing nozzle at a pressure lower than the predetermined pressure.

13. The washing device for a vehicle according to claim 11, wherein the tank and the electric pump are arranged in a front part of the vehicle, the camera washing nozzle and the window washing nozzle are arranged in a rear part of the vehicle, and the changeover valve device is arranged in the rear part of the vehicle.

14. The washing device for a vehicle according to claim 13, wherein the window washing nozzle, the camera washing nozzle, the changeover valve device, the wash control circuit, and a backup lamp, which is provided in the rear part of the vehicle and is lit when the shift lever is in the reverse position, are all provided in a back door.

15. The washing device for a vehicle according to claim 14, wherein the wash control circuit also controls operation of a wiper motor, and wiper motor is provided in the back door.

16. The washing device for a vehicle according to claim 11, further comprising:

a touch panel controlling section, which displays, on a display provided in the vehicle, an image captured by the onboard camera and a touch panel switch for washing the camera, during the reverse state, and actuates the electric pump based on the operation of the touch panel switch for washing of the camera.

17. The washing device for a vehicle according to claim 11, wherein the reverse state signal, which indicates that the vehicle is in reverse, is an electrical signal of the reverse position, the reverse position being one of multiple positions of the shift lever, the shift lever forming part of the transmission of the vehicle.

18. The washing device for a vehicle according to claim 17, wherein the reverse state signal is a power supply to a backup lamp provided in a rear part of the vehicle, the backup lamp is lit when the shift lever is in the reverse position, the wash control circuit is arranged in the rear part of the vehicle, and part of the power supply to the backup lamp is input as the reverse state signal.

* * * * *